SOUND RECORDING AND REPRODUCING APPARATUS

Filed Feb. 25, 1953 19 Sheets-Sheet 1

INVENTOR.
BARTON A. PROCTOR
BY
Knoase, Holte, Crewe & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 2

INVENTOR.
BARTON A. PROCTOR
BY
Moses, Nolte, Crews & Berry
ATTORNEYS

INVENTOR.
BARTON A. PROCTOR
BY
Moses, Nolte, Crews & Berry
ATTORNEYS

SOUND RECORDING AND REPRODUCING APPARATUS

Filed Feb. 25, 1953 19 Sheets-Sheet 4

INVENTOR.
BARTON A. PROCTOR
BY
Mosses, Holte, Crews & Berry
ATTORNEYS

INVENTOR.
BARTON A. PROCTOR
BY
Kwosee, Holte, Crews + Berry
ATTORNEYS

April 19, 1960 B. A. PROCTOR 2,933,319

SOUND RECORDING AND REPRODUCING APPARATUS

Filed Feb. 25, 1953 19 Sheets-Sheet 6

INVENTOR.

BARTON A. PROCTOR

BY

Moses, Nolte, Crews & Berry

ATTORNEYS

INVENTOR.
BARTON A. PROCTOR
BY
Moss, Nolte, Crews & Berry
ATTORNEYS

INVENTOR.
BARTON A. PROCTOR
BY
Morse, Holte, Crews & Berry
ATTORNEYS

INVENTOR.
BARTON A. PROCTOR
BY
Moses, Holte, Crews & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 10

INVENTOR.
BARTON A. PROCTOR
BY
Mosher Nolte Crews & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 11

INVENTOR.
BARTON A. PROCTOR
BY
Amoses, Holte, Crews & Berry
ATTORNEYS

INVENTOR.
BARTON A. PROCTOR
BY
Moses, Nolte, Crews & Berry
ATTORNEYS

INVENTOR.
BARTON A. PROCTOR
BY
Moses, Nolte, Crews & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 14

INVENTOR.
BARTON A. PROCTOR
BY
Mosier, Holte, Crews & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 15

INVENTOR.
BARTON A. PROCTOR
BY
Moses, Nolte, Crews & Berry
ATTORNEYS

INVENTOR.
BARTON A. PROCTOR
BY
Moses, Nolte, Crews & Berry
ATTORNEYS

INVENTOR.
BARTON A. PROCTOR
BY
Moses, Nolte, Crews & Berry
ATTORNEYS

April 19, 1960 B. A. PROCTOR 2,933,319

SOUND RECORDING AND REPRODUCING APPARATUS

Filed Feb. 25, 1953 19 Sheets-Sheet 18

INVENTOR.
BARTON A. PROCTOR
BY
Moses, Nolte, Crewe & Berry
ATTORNEYS

INVENTOR.
BARTON A. PROCTOR
BY
Moses, Nolte, Crews & Berry
ATTORNEYS

United States Patent Office 2,933,319
Patented Apr. 19, 1960

2,933,319

SOUND RECORDING AND REPRODUCING APPARATUS

Barton A. Proctor, Larchmont, N.Y., assignor, by direct and mesne assignments, to Proctor Dictating Machine Corporation, New York, N.Y., a corporation of New York

Application February 25, 1953, Serial No. 338,777

11 Claims. (Cl. 274—11)

The present invention relates to sound recording and reproducing apparatus, and more particularly to devices of this character which are suitable for use in aircraft or other vehicles or in offices or other stationary locations. This type of service requires a device which provides compactness, light weight, and resistance both to vibration, and to extreme variations both in temperature and in atmospheric pressure.

Many of the features of the present invention, although herein illustratively shown and described as applied to sound recording and reproducing apparatus utilizing a magnetizable and demagnetizable recording medium in tape or strip form, may be also applied to any sound recording and reproducing device utilizing a recording medium in strip form, including photoelectric devices which utilize photographic film in strip form, and devices which utilize a flexible strip form recording medium adapted to have a signal mechanically recorded thereon by a stylus which forms a groove extending longitudinally along the strip.

One of the objects of the invention resides in the provision of apparatus of this character comprising a removable magazine portion containing a pair of reels between which a recording medium in tape or strip form may be wound and unwound selectively to provide opposite directions of tape travel. The removable magazine portion of the recording device is fully interchangeable with other similar units and may be rapidly and conveniently removed from or applied to the remainder of the complete recording and reproducing apparatus.

Another object of the invention is to provide a magnetic recording and reproducing machine which utilizes a recording medium having a predetermined number of spaced parallel recording areas extending longitudinallly thereof.

A further object of the invention is the provision of a recording and reproducing device of this character which comprises transducing means movable transversely with respect to the recording medium, and means for moving the transducing means for selecting a particular one of the transversely spaced longitudinal recording areas of the recording medium for operative engagement with the transducing means, the selecting means cooperating with directional control means so that the direction of travel of the recording medium is always the same for any known longitudinal area of the tape-form recording medium.

Still another object of the invention is the provision of a tape-form recording medium wound upon reels of standard dimensions wherein the speed of travel of the recording medium, although continuously varying in accordance with the diameter of the outermost layer of recording medium wound upon the driven reel, nevertheless requires no compensation since the direction of travel of the recording tape and its velocity at each longitudinal portion thereof will always be the same at each such longitudinal portion. Moreover, the ratio between minimum and maximum diameters for the wound recording medium is sufficiently small so that the resulting range of linear speeds of the recording medium remains at all times within the operating range of the recording and reproducing transducing means and all other component parts of the recording and reproducing device.

Still another object of the invention is the provision of means for driving the tape at high speed for the selection of any desired longitudinal portion thereof, means being provided, however, for slowing down the tape upon approaching the end of the recording medium so that any reversal of the direction of tape travel at the end of the tape will take place at the relatively slow speed used for recording and reproducing operation.

A further object of the invention is the provision of both manually and electrically actuable means for selecting any one of the longitudinal recording areas for recording signals or for the reproduction of previously recorded signals.

Still another object of the invention is the provision of electromagnetic control means for selecting any desired recording area, which control means are normally disengaged, thereby preventing interference with manually operable control means, the manually operable control means being so arranged that no improper manipulation thereof may damage the control mechanism.

Another object of the invention is the provision of means for the actuation of a remote indicator for the purpose of indicating the longitudinal portion of the recording medium and the particular recording area thereof which is in operative engagement with the transducing means.

A further object of the invention is to provide brake means for the two reels between which the recording medium is wound and unwound, together with means for releasing the brake on the driven reel upon which the strip of recording medium is being wound, while allowing the brake on the idle reel from which the recording medium is being unwound to act as a frictional drag for maintaining tension in the recording medium during its travel between the two reels and its winding on the driven reel.

It is a feature of the invention that the brakes and brake drums for the two reels are carried by the interchangeable magazine portion of the apparatus and are selectively engageable by brake releasing means disposed in the main portion of the recording and reproducing device. The brakes are spring pressed against their respective brake drums, thereby preventing movement of the reels during handling of the magazine.

Another object of the invention is to provide means for driving the reels, disposed within the interchangeable magazine portion of the apparatus, this driving means comprising a pair of driven clutch members carried by the magazine and a pair of driving clutch members carried by the remaining portion of the recording apparatus each selectively engageable with one of the driven clutch members for driving the selected reel to cause winding of the recording medium thereon.

Another object of the invention is the provision of a recording and reproducing device of this character in which the component apparatus is mounted on a common mounting plate, the mounting plate being readily removable to permit free access to the component apparatus for purposes of maintenance and repair.

Other and further objects will become apparent upon reading the following specification, together with the accompanying drawing forming a part thereof.

Referring to the drawing.

Figure 1:
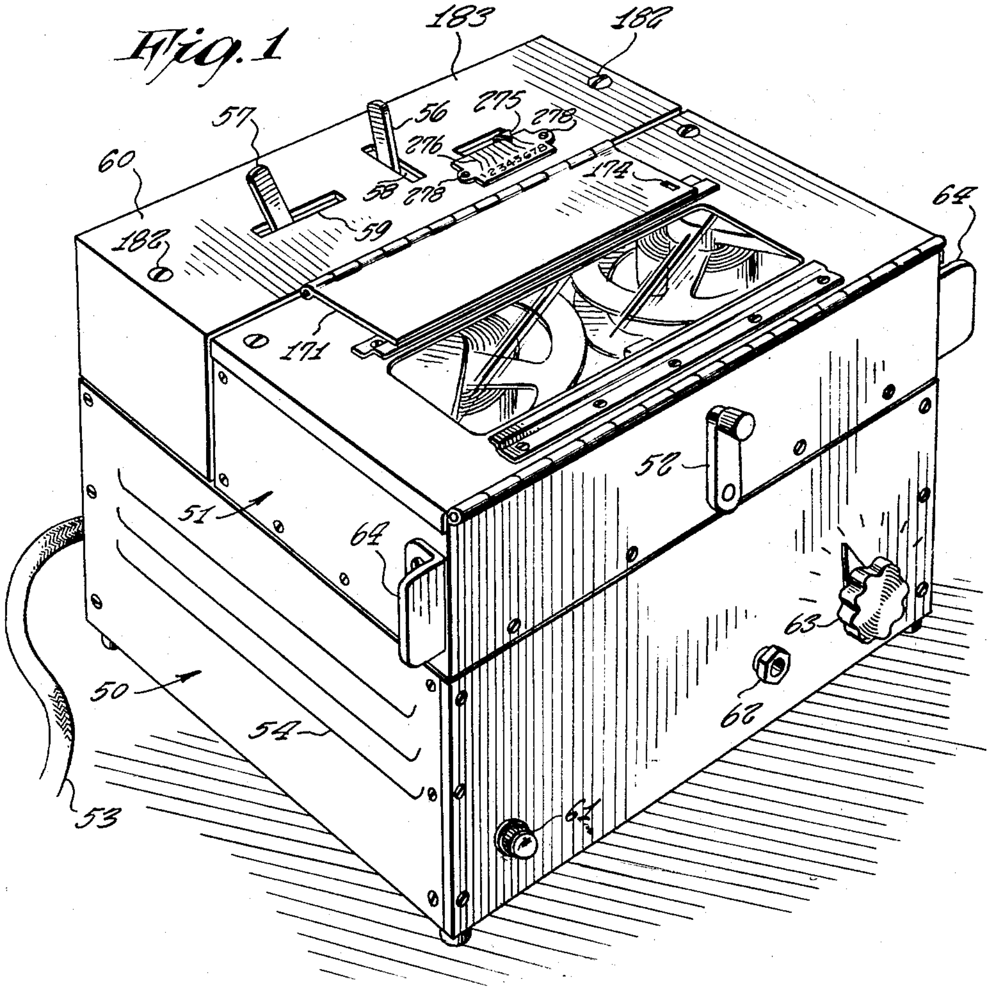
Figure 1 is a perspective view of an embodiment of the invention showing the cabinet of the device with the magazine positioned thereon and ready for use.

Referring to Figure 1, the complete recording and reproducing device comprises a lower section designated generally as 50 and referred to as the recording device, and a front upper removable section designated generally as 51 and referred to as the magazine.

Figure 3:
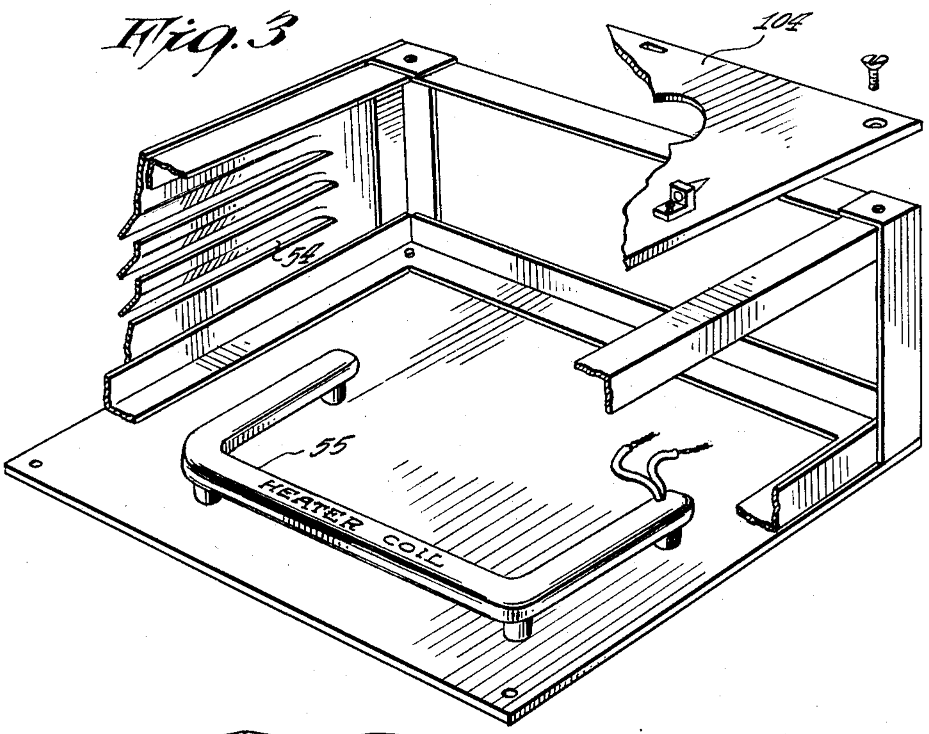
Figure 3 is a fragmentary perspective view of the bottom portion of the cabinet shown in Figure 1.

Disposed on the front of the magazine 51 is a locking lever 52 shown positioned for locking the magazine to the recording device. A flexible cable 53 is provided for connection of the complete recording and reproducing device to amplifying and control apparatus (not shown). The side walls of the recording device are provided with ventilating louvers 54 which, in conjunction with a thermostatically controlled electrical heating element 55 (Fig. 3) serve to keep the interior of the recording device ventilated and relatively free from moisture. A thermostat 55a (Fig. 6) controls heating element 55 to provide the desired temperature.

A manually operable recording head carriage elevating lever 56 and a manually operable recording head carriage lowering lever 57 project upwardly through elongated slots 58 and 59, respectively, formed in the upper cover 60 of the recording unit 50.

On the front panel of the recording unit 50, there are provided a pilot light, fuse holder or similar auxiliary device 61, monitoring jack 62 and a volume control 63.

The magazine 51 is provided at its sides with laterally projecting ears 64 to facilitate handling of the complete unit 50—51 and handling of the magazine 51 separately, when detached from the recording device 50.

Figure 5:
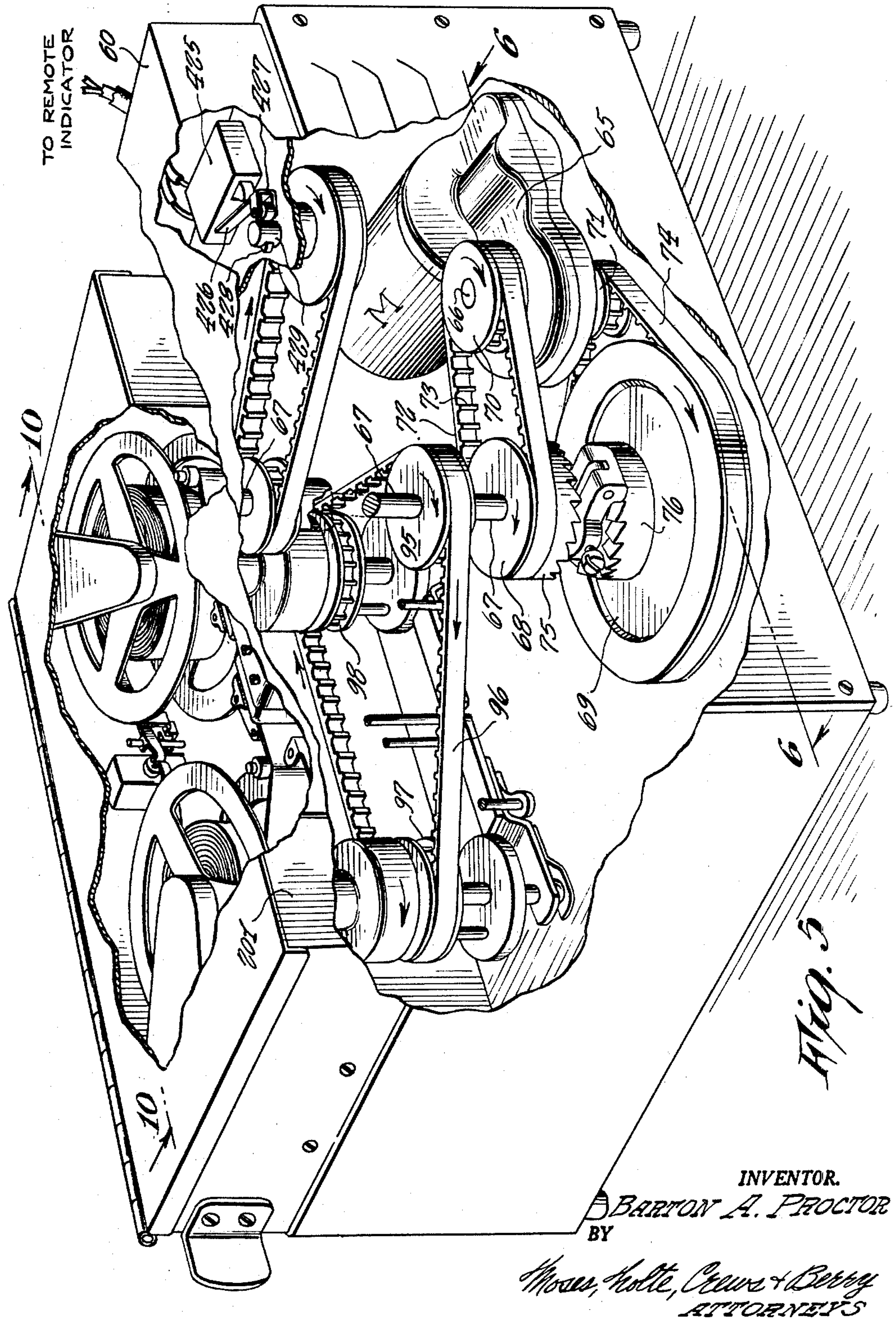
Figure 5 is a perspective view, partly broken away, showing the driving mechanism for reeling and unreeling the recording medium.

Referring to Figure 5, the recording unit is provided with an electric motor M of constant speed characteristics, connected through conventional speed reducing gearing enclosed in a housing 65 to a vertical drive shaft 66. The speed reducing gearing comprises a worm 65a driven by motor M and engaging a worm wheel 65b fixed to vertical drive shaft 66 (Fig. 6).

Figures 6, 7:
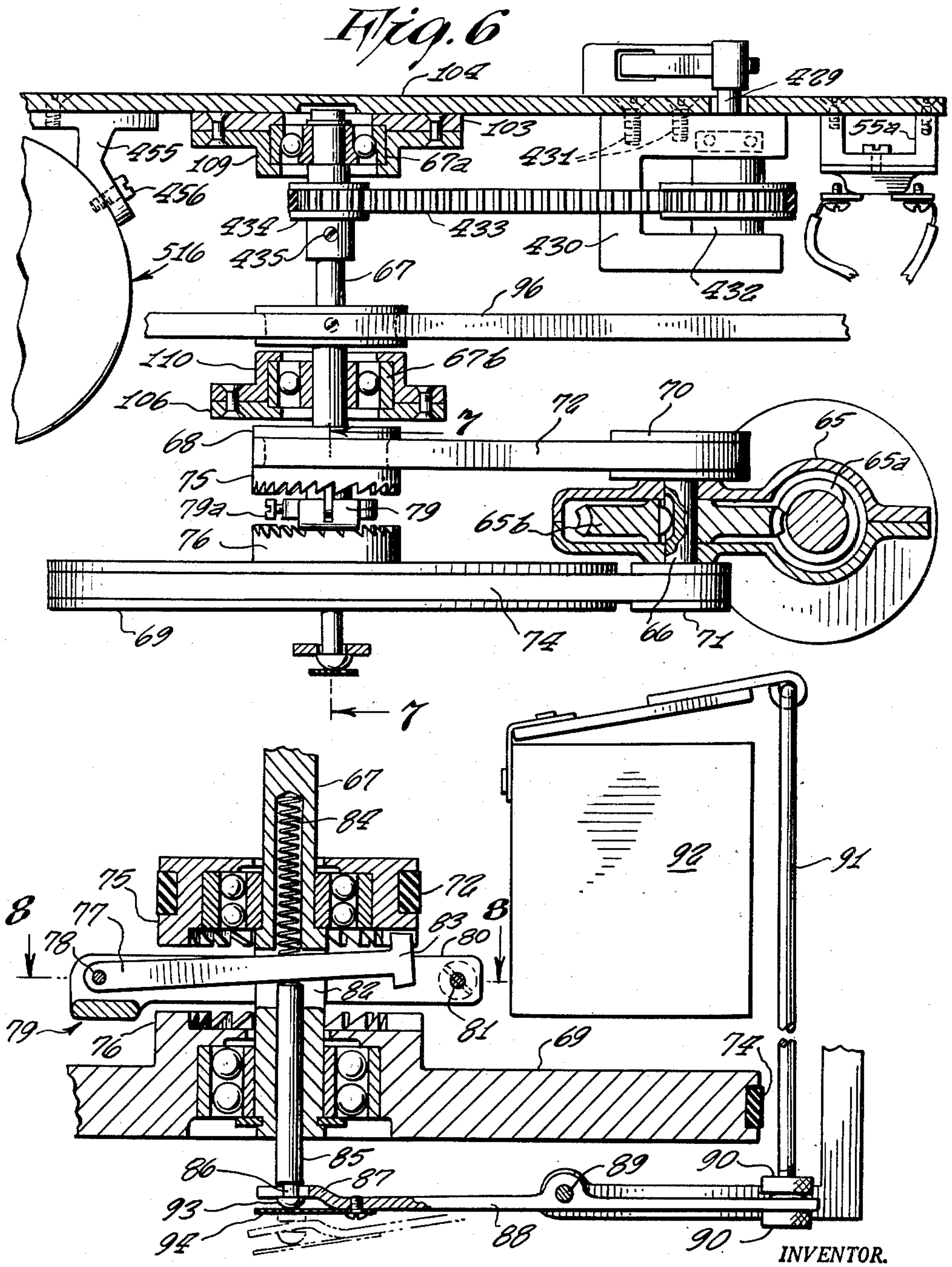
Figure 6 is a fragmentary sectional view in elevation taken along the line 6—6 of Figure 5, looking in the direction of the arrows.
Figure 7 is an enlarged detail view in sectional elevation, taken along the line 7—7 of Figure 6, looking in the direction of the arrows, and showing the speed control clutch mechanism for selectively providing normal driving speed and high speed rewinding movement of the recording medium.

Disposed in spaced relationship with respect to vertical drive shaft 66 is a vertical driven shaft 67 suitably journaled in upper and lower ball bearings 67a and 67b, respectively (Fig. 6). Freely revolubly mounted on driven shaft 67 is an upper high speed sprocket wheel 68 of relatively small diameter and a lower normal speed sprocket wheel 69 of relatively large diameter. Fixed to the upper end of vertical drive shaft 66 is a high speed driving sprocket wheel 70 of relatively large diameter and fixed to the lower end of vertical drive shaft 66, beneath the reduction gear housing 65, is a normal speed driving sprocket wheel 71.

The high speed driving sprocket wheel 70 drives the high speed driven sprocket wheel 68 by means of an endless flexible belt 72 provided with uniformly spaced inwardly extending projections 73 which are shaped for engagement with correspondingly spaced recesses between adjacent teeth of sprocket wheels 68 and 70. A similar endless belt 74 connects the normal speed driving sprocket wheel 71 to the normal speed driven sprocket wheel 69.

A serrated clutch member 75 is fixed to the under side of high speed driven sprocket wheel 68, and a similar serrated clutch member 76 having similarly sloping upwardly directed teeth disposed on its upper surface is arranged with its teeth opposite the teeth on the under surface of clutch member 75.

Figure 8:
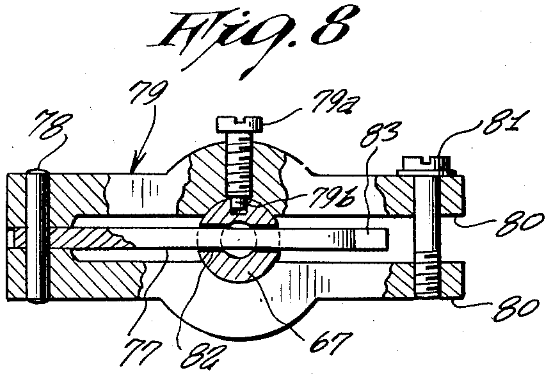
Figure 8 is an enlarged plan sectional view taken along the line 8—8 of Figure 7.
Figure 9:
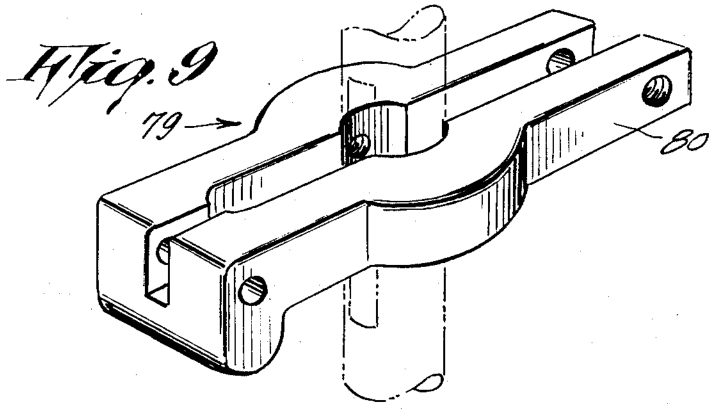
Figure 9 is an enlarged perspective view of a bifurcated yoke member for securing the arm of a speed selecting clutch member to a vertical shaft.

Disposed intermediate clutch members 75 and 76, is a speed selecting clutch arm 77 (Fig. 7) pivoted at 78 to a bifurcated yoke member 79. The free ends 80 of bifurcated yoke member 79 (Figs. 8 and 9) are held together by a screw 81 securely clamping yoke member 79 to driven shaft 67. As shown in Figure 8, yoke member 79 is further secured to driven shaft 67 by a radially inwardly extending screw 79a having a tip portion 79b of reduced diameter which fits snugly into a correspondingly shaped hole or recess in shaft 67.

Driven shaft 67 is vertically slotted at 82 and clutch arm 77 is freely angularly movable in this slot. The free end of clutch arm 77 terminates in a T-shaped head 83 which is selectively engageable either with the downwardly directed teeth of high speed clutch member 75 or with the upwardly directed teeth of normal speed clutch member 76.

A helical compression spring 84 disposed in a hollow portion of driven shaft 67 extending upwardly from slotted portion 82 presses downwardly on clutch arm 77 urging the T-shaped head 83 into engagement with the upwardly directed teeth of normal speed clutch member 76.

A vertically extending clutch actuating pin 85 is freely vertically slidable in the lower portion of driven shaft 67 and its upper end engages the under side of clutch arm 77 intermediate its ends and in alignment with compression spring 84. The lower end of clutch actuating pin 85 has a circumferential groove 86 formed therein, which is engaged by the bifurcated end 87 of a clutch actuating lever 88. Clutch actuating lever 88 is pivotally mounted intermediate its ends on a fixed pivot pin 89, the end opposite the bifurcated end 87 being disposed intermediate two adjustable knurled collar members 90 threadedly mounted at the lower end of a vertical clutch actuating rod 91.

Clutch actuating rod 91 may be moved downwardly by the energization of a clapper type electromagnet designated generally as 92, the compression spring 84, acting through the pivoted clutch actuating lever 88, serving to restore the parts to their normal driving speed position as shown in dotted lines in Figure 7. For high speed driving of shaft 67, electromagnet 92 is energized, rotating clutch actuating lever 88 in a clockwise direction about its pivot 89 and raising clutch arm 77 for engagement with high speed clutch member 75. Deenergization of electromagnet 92 permits compression spring 84 to force clutch arm 77 downwardly into engagement with the teeth of normal speed clutch member 76.

For the purpose of reducing friction, the lower end of clutch actuating pin 85 is rounded at 93 and engages the upper surface of a horizontally extending member 94 carried beneath and adjacent to the bifurcated end 87 of clutch actuating lever 88, the bifurcated end 87 being in loosely fitting engagement with the circumferential groove 86 at the lower end of clutch actuating pin 85.

Figure 10:
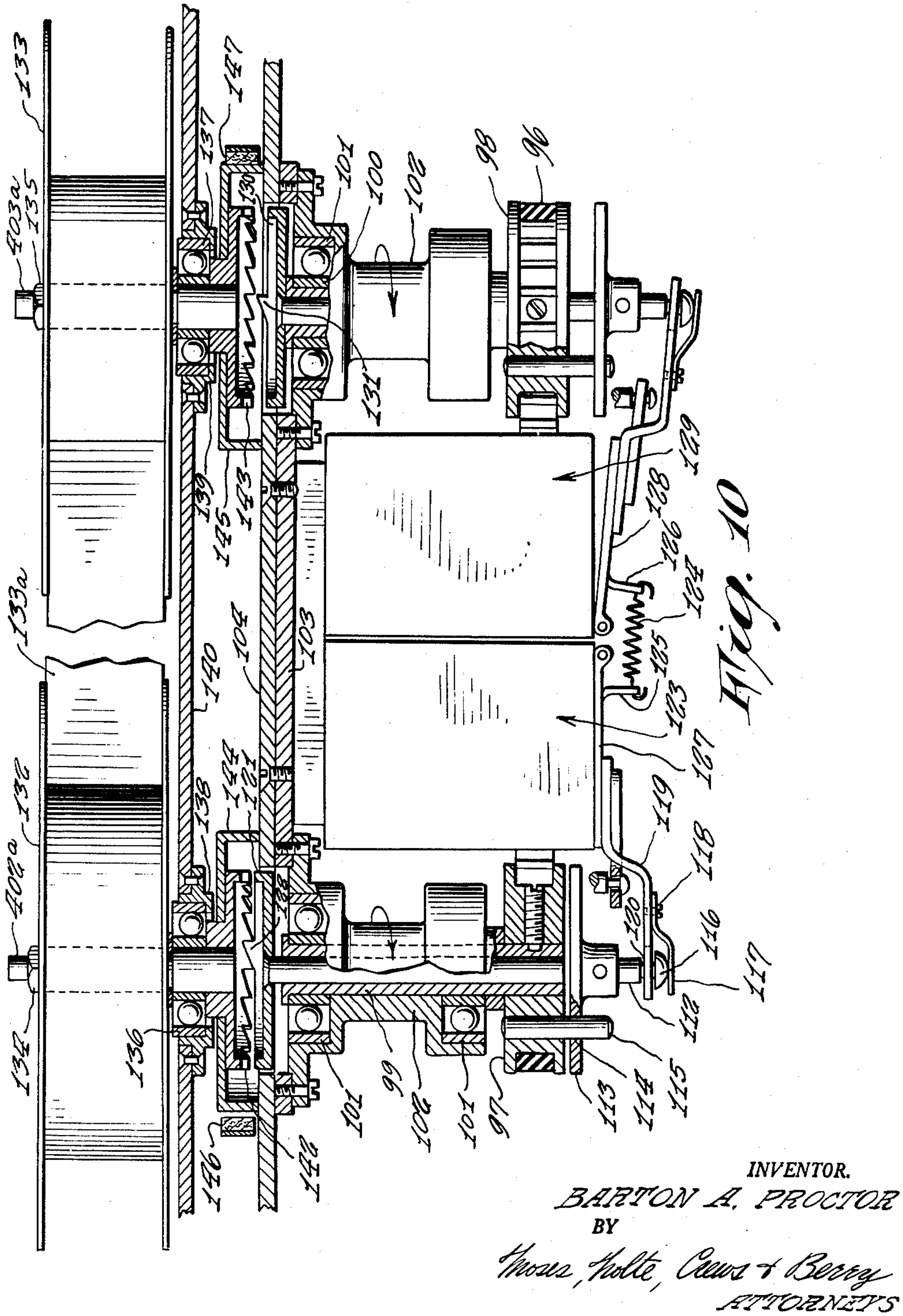
Figure 10 is an enlarged fragmentary sectional view in elevation taken along the line 10—10 of Figure 5, looking in the direction of the arrows, showing the reel driving clutch mechanism.

Disposed above high speed driven sprocket 68, and fixed to driven shaft 67 is a reel driving sprocket 95 (Fig. 5) connected by a toothed flexible endless belt 96 to sprockets 97 and 98 fixed to hollow vertical reel driving shafts 99 and 100, respectively (Fig. 10). The three sprockets 95, 97 and 98 always rotate together in the same counterclockwise direction, as viewed in Figure 5.

Figure 4:
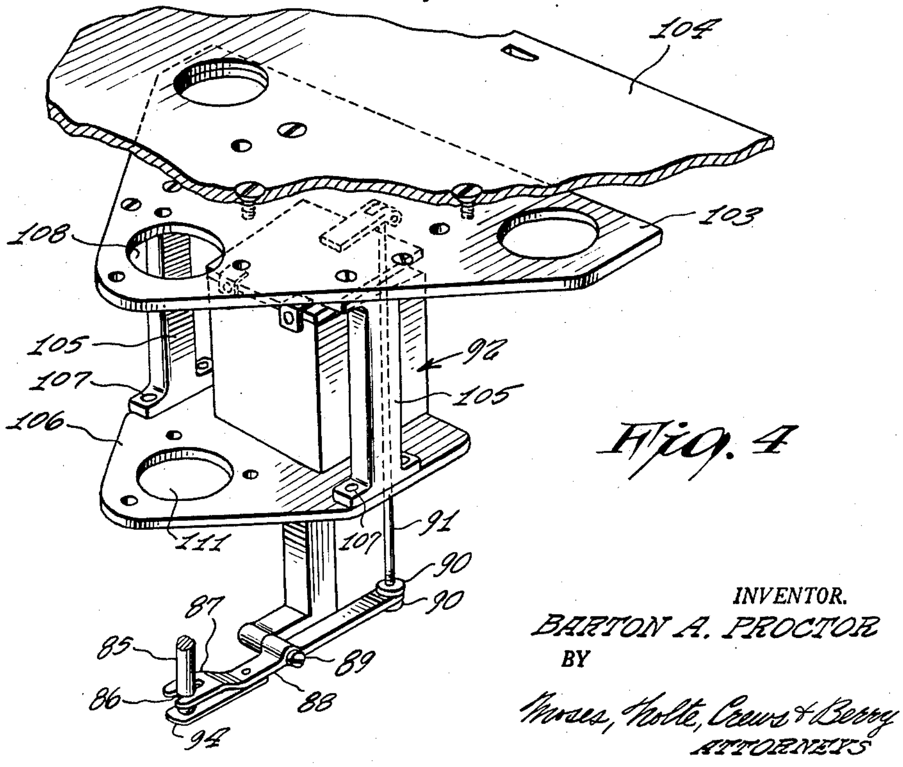
Figure 4 is an enlarged fragmentary perspective view showing mounting plates which support speed changing and reel driving mechanism, together with a clutch engaging electromagnet.

Two hollow shafts 99 and 100 (Fig. 10) are advantageously journaled in upper and lower ball bearings 101 mounted in housings 102. The housings 102 are secured to the under side of an upper horizontal mounting plate 103 (Fig. 4), and mounting plate 103 is in turn secured to the under side of a main apparatus mounting plate 104 of the recording device 50. Parallel vertical spacing members 105 extend downwardly from mounting plate 104 and a lower mounting plate 106 is secured to the lower ends of spacing members 105 by any convenient means such as screws 107. The upper ball bearings 67a (Fig. 6) in which driven shaft 67 is journaled, is disposed beneath mounting plates 103 and 104 concentrically with a circular aperture 108 formed in upper mounting plate 103, the upper bearing 67a being disposed in a housing 109 secured to the under side of mounting plate 103. The lower bearing 67b in which shaft 67 is journaled, is disposed in a bearing housing 110 secured to lower mounting plate 106, the shaft 67 being concentric with a circular aperture 111 formed in lower mounting plate 106 and vertically aligned with the aperture 108 in upper mounting plate 103. The speed selecting clutch control magnet 92 (Fig. 7) is also disposed on the lower mounting plate 106 as shown in Fig. 4.

Freely vertically movable in hollow shaft 99 is a reel driving clutch control shaft 112 (Fig. 10). A disc member 113 is fixed to control shaft 112 near its lower end and is apertured at 114 to receive a downwardly extending pin 115. Pin 115 is fixed to sprocket 97 and passes freely through aperture 114 of disc member 113 permitting vertical movement of control shaft 112 and disc member 113 while driving engagement is maintained between pin 115 and disc member 113.

Control shaft 112 is rounded at its lower end, as indicated at 116, and rests upon a horizontally extending member 117 secured by a rivet 118 to an electromagnetically actuated arm 119. As viewed in Figure 10, the left hand end of arm 119 is bifurcated and embraces a peripheral slot 120 formed adjacent to the lower end of control shaft 112.

Fixed to the upper end of control shaft 112 is a cup-shaped driving clutch member 121 provided with two upwardly directed sloping teeth 122 at diametrically opposed (Fig. 14) portions of the periphery of clutch member 121. Arm 119 is actuated by an electromagnet 123 (Fig. 10), the bifurcated end 120 of arm 119 being raised by energization of electromagnet 123, thereby raising control shaft 112 and driving clutch member 121 fixed to its upper end. Upon deenergization of electromagnet 123, a helical retractile tension spring 124 interconnecting downwardly projecting lugs 125 and 126 serves to lower control rod 112. Lug 125 is fixed to the armature 127 of electromagnet 123 and lug 126 is fixed to the armature 128 of a similar electromagnet 129, thereby permitting retractile spring 124 to serve both electromagnets 123 and 129 in common.

Electromagnet 129 controls a driving clutch member 130 provided with two upwardly directed diametrically opposed teeth 131 in the same manner that driving clutch member 121 is controlled by electromagnet 123. Thus energization of electromagnet 123 raises clutch member 121 and energization of electromagnet 129 raises clutch member 130 for selectively controlling the direction of movement of the recording medium.

Figures 11, 12:
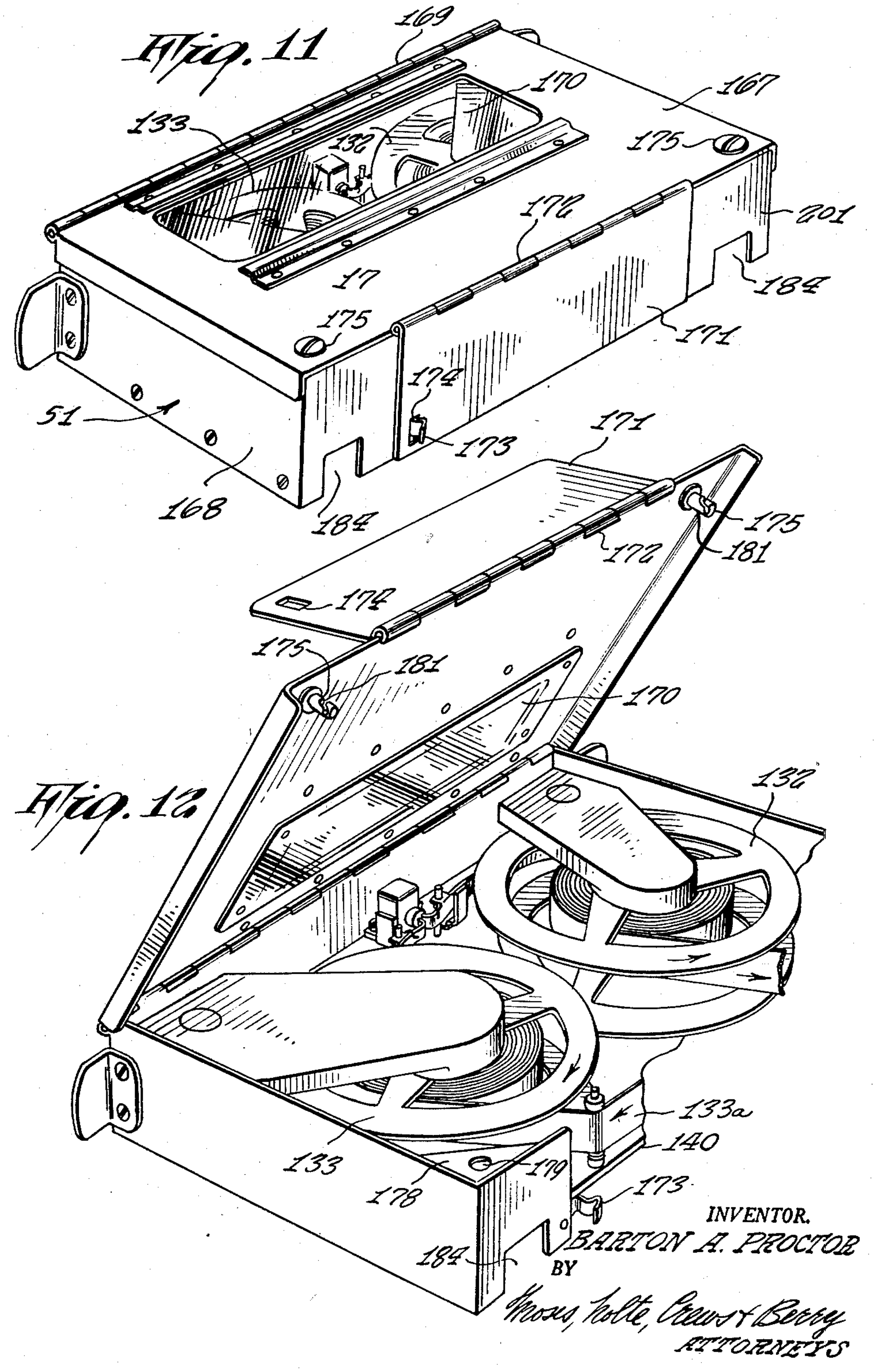
Figure 11 is a rear perspective view of the magazine with the cover closed.
Figure 12 is a rear perspective view of the magazine, partly broken away, with the cover in raised position.

The magazine 51 is provided with two reels 132 and 133 (Fig. 12), between which a strip of recording medium 134 may be wound and unwound. The reels 132 and 133 always rotate in opposite directions. A strip of recording medium or magnetic recording tape 133a of known material, is wound in opposite directions on the two reels (Fig. 12). The driven reel upon which the magnetic tape 133a is being wound always rotates in a clockwise direction, as viewed in Figure 12. As shown, the magnetic tape 133a is being wound on reel 133 and is being unwound from reel 132, travelling from right to left. In this manner, driving either of the reels 132 or 133 will cause the magnetic tape 134 to be unwound from the other reel.

The reels 132 and 133 are supported on upright shafts 134 and 135 (Fig. 10), respectively, the shafts 134 and 135 being of square cross-section to engage correspondingly shaped holes in reels 132 and 133, thereby providing a suitable driving connection between the reels 132 and 133 and their respective shafts 134 and 135.

Shafts 134 and 135 are journaled at their lower ends in ball bearings 136 and 137 (Fig. 10), disposed in bearing housings 138 and 139, respectively, and the lower ends of shafts 134 and 135 extend through the floor 140 of magazine 51. Fixed to the lower ends of shafts 134 and 135 are serrated driven clutch members 142 and 143, respectively. The driven clutch members 142 and 143 are provided with downwardly directed sloping teeth having vertical surfaces arranged for engagement with similar vertical surfaces on the two teeth 122 of driving clutch member 121, in the case of driven clutch member 142, and similar teeth 131 on driving clutch member 130 in the case of driven clutch member 143. The teeth of the driving and driven clutch members have the same slope, thereby enhancing the engagement between the driving and driven clutch members.

Figure 13:
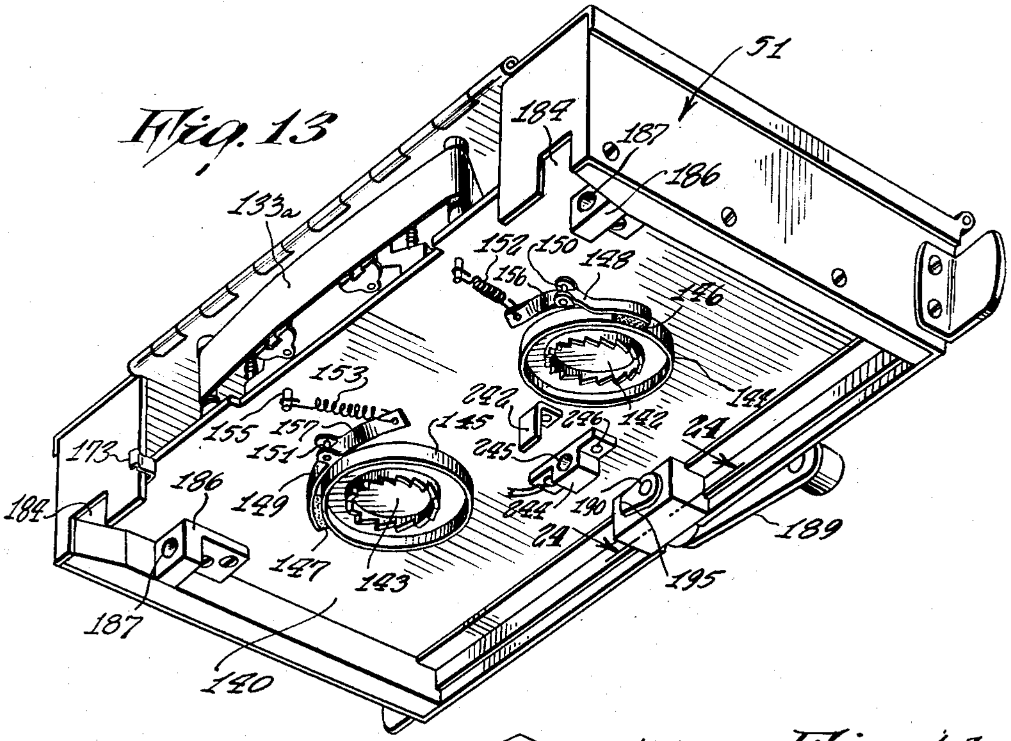
Figure 13 is a bottom perspective view of the magazine.

Also fixed to the reel driving shafts 134 and 135 near their lower ends are brake drums 144 and 145 engageable by brake pads 146 and 147, respectively. As may best be seen in Figure 13, the brake pads 146 and 147 are carried at the ends of brake arms 148 and 149, the brake arms 148 and 149 being pivoted intermediate their ends at 150 and 151, respectively. The pivot pins 150 and 151 which support brake arms 148 and 149 are fixed to the under side of the floor 140 of magazine 51.

The free ends of brake arms 148 and 149 are connected by helical tension springs 152 and 153 to fixed studs 154 and 155 mounted on the under side of magazine floor 140. The tension springs 152 and 153 tend to urge the brake pads 146 and 147 into frictional engagement with their respective brake drums 144 and 145. Brake arms 148 and 149 are constructed of strip material of rectangular cross-section, and the portions intermediate pivot pins 150 and 151 and the tension springs 152 and 153 are twisted at an angle to form inclined camming surfaces 156 and 157, respectively, on the brake arms 148 and 149. These inclined camming surfaces 156 and 157 are engageable by upward movement of either of the conical points 158 or 159 (Fig. 14) of vertically movable brake releasing rods 160 and 161, respectively, to disengage the corresponding brake pads 146 or 147 from brake drum 144 or 145 (Fig. 22).

Figures 22, 23, 24, 25, 26:
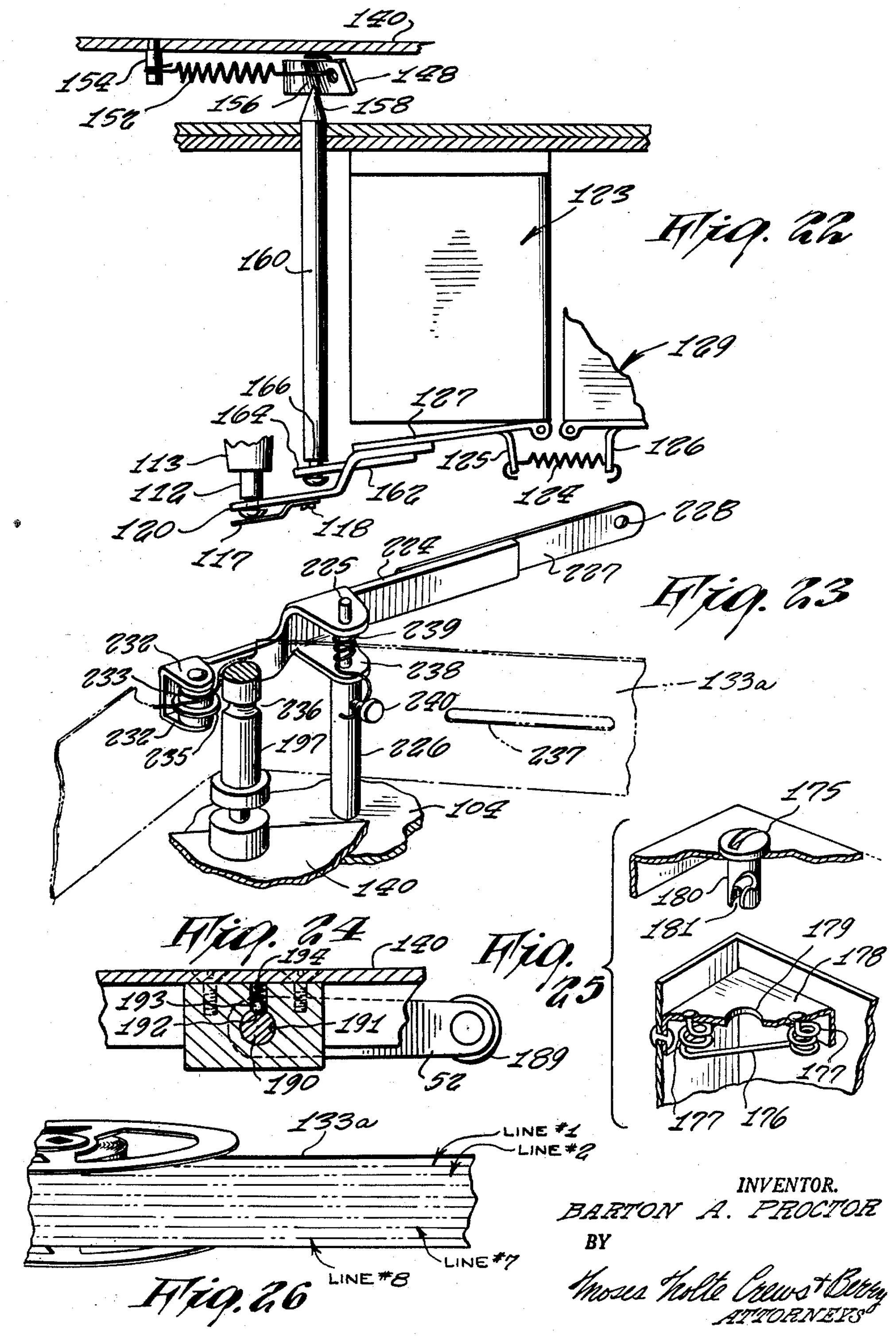
Figure 22 is an enlarged elevational view taken along the line 22—22 of Figure 12, showing a combined reel drive clutch control and brake releasing magnet, the brake arm having been rotated in a horizontal plane by approximately 90 degrees to show the engagement between the conical end of the brake releasing rod and the camming surface of the brake arm.
Figure 23 is an enlarged fragmentary perspective view of the reversing control contact mechanism of Figure 20.
Figure 24 is an enlarged sectional view in elevation taken along the line 24—24 of Figure 11 showing a spring pressed ball detent mechanism for retaining a locking handle in either of two positions for locking the magazine to the recording device or unlocking the magazine therefrom.
Figure 25 is a fragmentary perspective view, partly in section, showing a detail of a slotted head quick release attaching device at the upper rear corners of the magazine for holding the hinged cover of the magazine in its closed position.
Figure 26 is a fragmentary perspective view of a detail, showing the locations of the center lines of the vertically spaced longitudinally extending recording areas on the recording medium.

Referring to Figure 22, the reel driving clutch control electromagnet 123 is provided with an additional actuating arm 162 fixed to its armature 127 for movement therewith. Arm 162 is formed with a bifurcated end 164 which embraces a circumferential groove 166 at the lower end of brake releasing rod 160. Energization of control magnet 123, in addition to raising clutch control shaft 112, also raises brake releasing rod 160 whose conically shaped upper end 158 engages the inclined camming surface 156 of brake arm 148 and thereby disengages brake pad 146 from brake drum 144 against the yielding tension of spring 152. The brake pad 147 is similarly disengaged from brake drum 145 by energization of control magnet 129.

Thus, if the tape is to run in one direction, control magnet 123 is energized which thereupon engages driving and driven clutch members 121 and 142, respectively to drive reel 132, at the same time releasing brake pad 146 from engagement with brake drum 144. Brake pad 147, however, remains in contact with brake drum 145 providing a frictional drag on reel 133, maintaining a certain predetermined amount of tension in magnetic tape 133a. Upon disengagement of driving and driven clutch members 121—142, brake pad 146 reengages brake drum 144, and together with brake pad 147 which was already acting on the other brake drum 145, stops both reels 132 and 133 with a minimum of coasting and accompanying waste of unused recording space along magnetic tape 133*a*.

By selective energization of either electromagnet 123 or 129 the magnetic tape 133*a* may be started or stopped with rapid acceleration in either direction of travel.

Referring to Figures 11 and 12, the magazine 51 is provided with a cover 167 connected to the magazine housing 168 by a piano type hinge 169. Near its front, cover 167 is provided with a transparent window 170 permitting observation of the reels 132 and 133 and the amount of magnetic tape on each reel. A further rear cover member 171 is hingedly connected to the rear edge of magazine cover 167 at 172, and the rear cover member 171 is folded forwardly to lie on top of cover 167 when the magazine 51 is in use, as shown in Figure 1. When the magazine 51 is removed from the recording device 50, the rear cover member 171 is moved to a vertical downwardly extending position as shown in Figure 11, being held in this position by a spring catch 173 which engages one side of a rectangular aperture 174 formed in cover member 171. Cover member 171 closes the magazine for protection of the magnetic tape 134 and of the reels 132 and 133 when the magazine 51 is removed from the recording device 50 and is not in use.

A pair of rapid disengaging slotted head fastening devices 175 are provided at the rear corners of the magazine 51, and these slotted head devices are provided with extending hollow shank portions having diametrically opposed helical slots formed therein for engagement with a transversely extending member 176 (Fig. 25) disposed between two helical compression springs 177, said transverse member 176 preferably being formed integrally with the compression springs 177 from the same piece of wire. The spring assembly 176—177 is disposed on the under side of a horizontal corner plate 178 which is apertured at 179 to allow the shank portion 180 of headed device 175 with its helical slots 181 to pass therethrough for engagement with the resiliently mounted transverse member 176.

Similar fastening devices 182 (Fig. 1) secure the upper cover 60 of the recording device 50, the upper cover 60 thus being rapidly removable for maintenance or repair of the component apparatus of the recording device 50 located above the main apparatus mounting plate 104 and beneath the upper cover 60.

Figures 14, 15, 16:
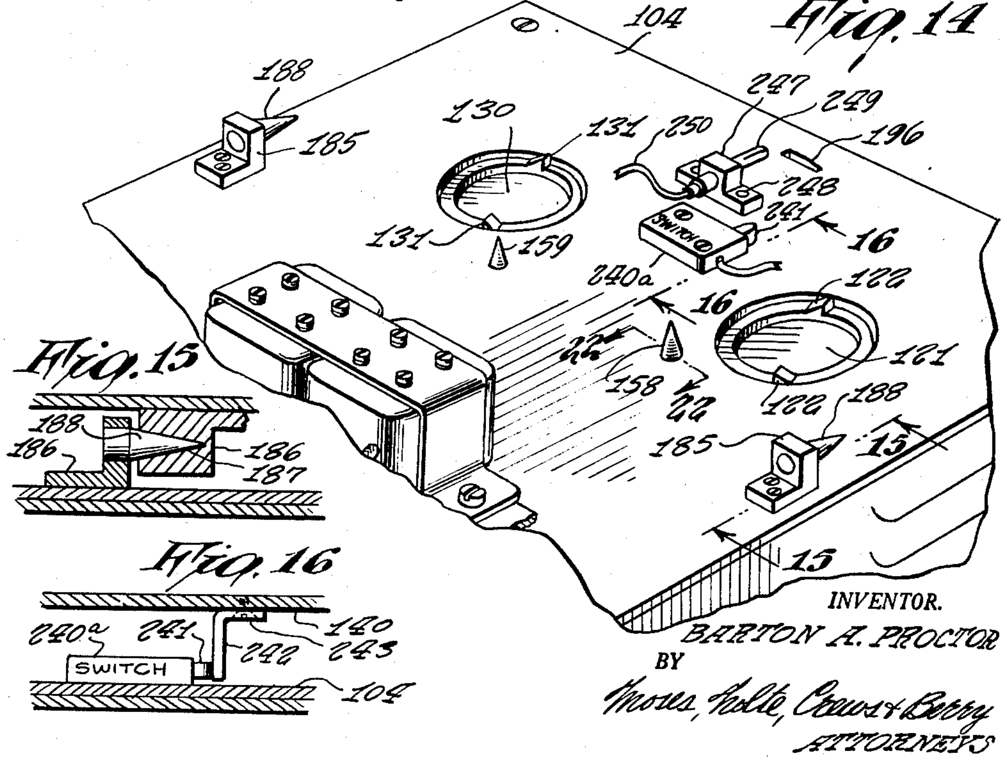
Figure 14 is a fragmentary perspective view of the recording device showing the upper side of the main apparatus mounting plate.
Figure 15 is an enlarged detail view in sectional elevation, taken along the line 15—15 of Figure 14, showing a locking member for attaching the magazine to the recording device.
Figure 16 is an enlarged detail view in sectional elevation taken along the line 16—16 of Figure 14, showing a switch and an actuating member therefor, the switch being arranged to render the recording device inoperative when the magazine is removed therefrom.

The magazine 51 is provided at its lower rear edge with downwardly directed rectangular notches 184 which are arranged to clear L-shaped supporting brackets 185 (Figs. 13 and 14) disposed at opposite sides of main apparatus mounting plate 104. Secured to the under side of magazine floor 140 are a pair of L-shaped blocks 186 having rearwardly directed conical apertures 187 formed therein (Fig. 15). These apertures 187 are shaped for engagement with conically shaped forwardly projecting members 188 carried by supporting brackets 185. Thus, when the magazine 51 is placed on the recording device 50 and pushed rearwardly, the conical projecting members 188 enter the conical recesses 187 in blocks 186 and secure the magazine 51 against movement in both lateral and vertical directions, at the same time limiting further rearward movement of the magazine 51.

A locking handle 52 (Fig. 1) provided with a knob 189 is mounted at the front of the magazine on a shaft 190 (Fig. 24) journaled in a supporting block 191 fixed to the under side of magazine floor 140. The handle 52 permits a magazine 51 to be quickly unlocked and replaced by another magazine.

Figure 17:
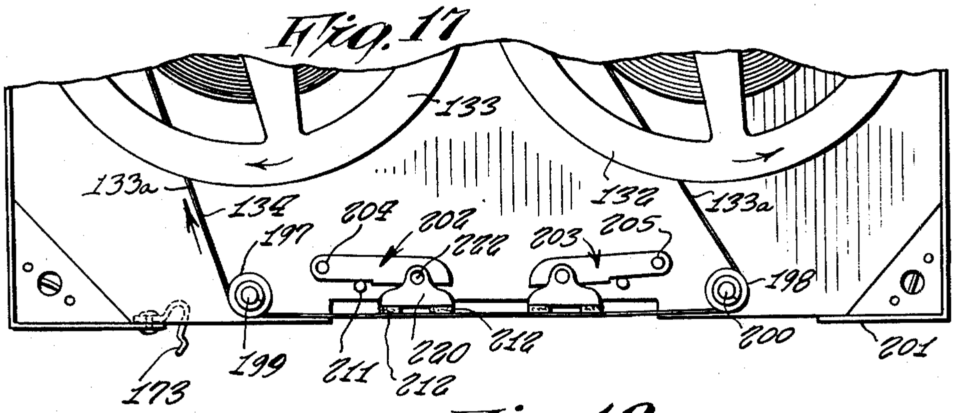
Figure 17 is a fragmentary plan view of the rear portion of the magazine with the magazine removed from the recording apparatus.
Figures 18, 19, 20, 21:
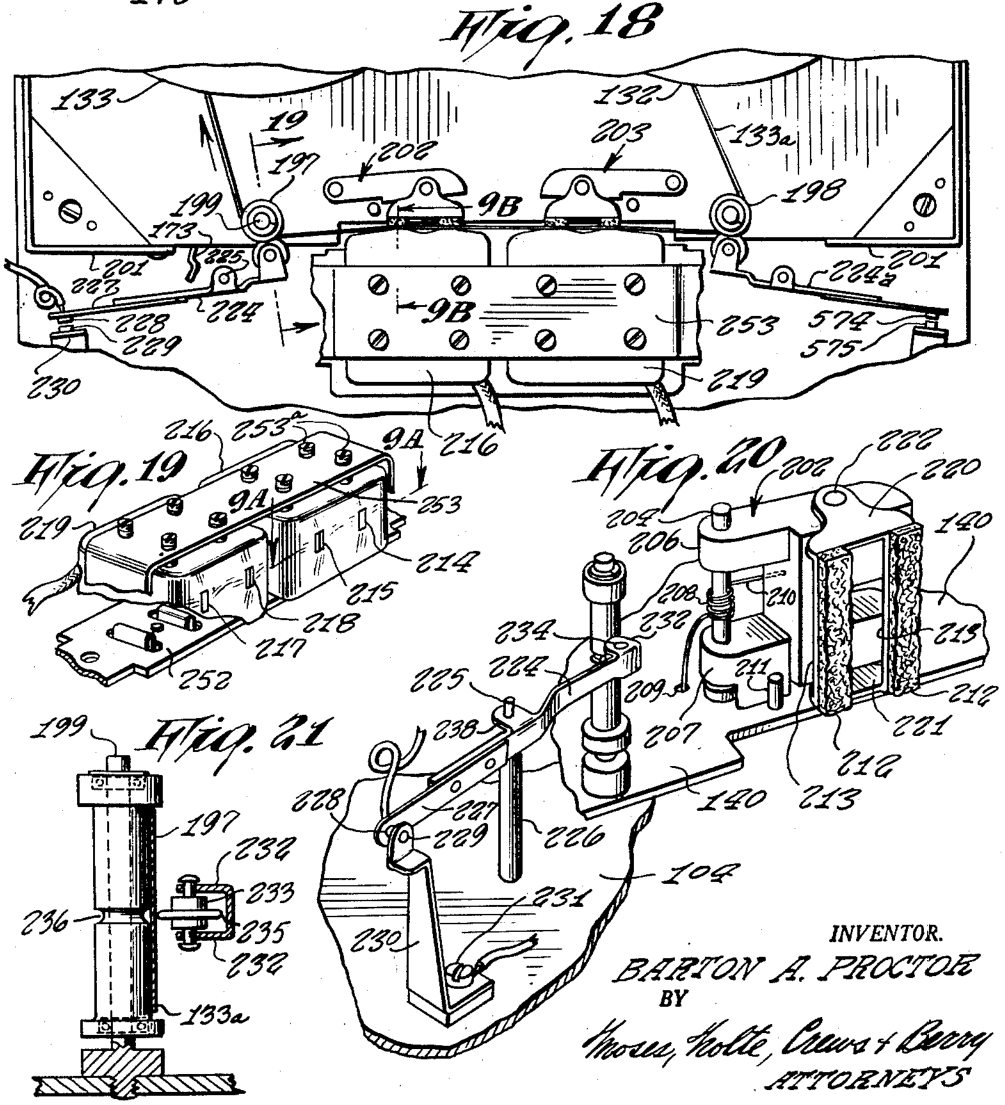
Figure 18 is a view similar to Figure 17, with the magazine in operative position in the recording device, showing the recording medium in engagement with the recording heads.
Figure 19 is a perspective view of a detail, showing the mounting of the recording heads.
Figure 20 is a perspective view of a detail, illustrating a reversing control contact mechanism of the recording device and a pressure pad member of the magazine for urging the recording medium into engagement with the recording heads.
Figure 21 is an enlarged elevational view taken along the line 21—21 of Figure 18, showing a part of the reversing control contact mechanism shown in Figure 20.

Shaft 190 has two recesses 191 and 192 formed therein and disposed at points angularly displaced from each other on shaft 190 by 90 degrees. A spring pressed ball detent comprising a ball 193 and a helical compression spring 194 yieldingly engages the recess 192 when the handle 189 is in its horizontal position to unlock the magazine 51 from the recording device 50. When the handle 189 is raised to its vertical locking position, ball 193 engages the recess 191. When the handle 189 is raised to its vertical locking position, a locking tongue 195 (Fig. 13) fixed to the rear end of shaft 190, is turned downwardly and enters into locking engagement with a tapered slot 196 (Figs. 13 and 14) formed in the main apparatus mounting plate 104 of the recording device 50. Locking tongue 195 holds the front portion of the magazine 51 securely against both forward and rearward movement by reason of the camming action of tapered slot 196, and conical members 188 engaging the conical apertures 187 in blocks 186 prevent both rearward and lateral movement, in addition to upward movement of the rear portion of magazine 51. Upward movement of the front portion of the magazine is prevented by means hereinafter described. In this manner, magazine 51 may be securely locked to recording device 50 by raising handle 189 to its vertical position and may be unlocked therefrom by rotating handle 189 to its horizontal position, the handle being held in either position by the spring pressed ball detent 193—194. Referring to Figures 17 and 18, the magnetic tape 133*a* passes over rollers 197 and 198 freely revolubly mounted on upright posts 199 and 200, respectively, the rollers 197 and 198 being disposed immediately behind the reels 133 and 132, respectively. The magnetic tape thus follows a path of travel which is parallel to the rear wall 201 of the magazine 51 somewhat inside wall 201.

A pair of pressure pad arms 202 and 203 are pivotally mounted on upright posts 204 and 205, respectively. The pressure pad arms 202 and 203 are provided with upper and lower spaced horizontally extending arm portions 206 and 207, respectively (Fig. 20), and a helical torsion spring is mounted on upright post 204. One end of torsion spring 208 is held in a hole in magazine floor 140 at 209, and the other end bears against the front surface of pressure pad arm 202 at 210. A pin 211 fixed to magazine floor 140 limits the rearward travel of pressure pad arm 202 caused by the torsion spring 208.

Two spaced vertically extending strips of resilient pad material 212, such as felt, for example, are secured in any convenient manner to two similarly spaced vertical pressure pad supports 213. The spacing between the resilient strips conforms to the spacing between the recording caps 214 and 215 of recording head 216 (Fig. 19). The other symmetrically arranged pressure pad arm 203 is similar in all respects to pressure pad arm 202 described above, the spacing of the resilient strips being in conformity with the spacing between the recording caps 217 and 218 of the other recording head 219.

The pressure pad supports 213 are fixed at their upper and lower ends respectively, to support holding members 220 and 221 pivoted to the upper and lower arm horizontal portions 206 and 207 of pressure pad arm 202 at 222 and 223. In this manner the resilient strips 212 are free to pivot about a vertical axis for alignment with the recording caps 214 and 215, the magnetic tape 133*a* being pressed into contact with the recording caps 214 and 215 by the resilient action of torsion spring 208.

Figures 9A, 9B:
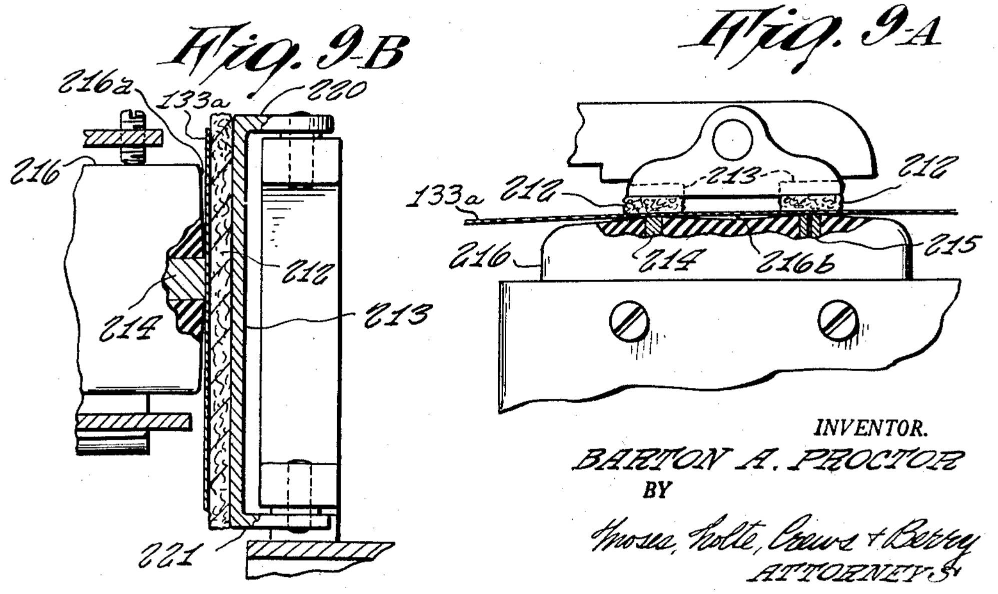
Figure 9A is an enlarged fragmentary plan view, partly in section, of one of the recording heads in engagement with the recording medium, taken along the line 9A—9A of Figure 19.
Figure 9B is an enlarged fragmentary elevational view, partly in section, of the recording head shown in Figure 9A, taken along the line 9B—9B of Figure 18, looking in the direction of the arrows.

Referring to Figures 9A and 9B, it will be seen that the portion of the recording head 216 is slightly cut away by a very small amount around each of the recording caps or pole faces 214 and 215 as indicated at 216*a* in Figure 9*b* and at 216*b* in Figure 9*a*. This avoids contact between the magnetic tape 133*a* and the body of the recording head 216. Such contact is undesirable, particularly in that portion of the magnetic tape 133*a* which is pressed into engagement with the recording caps 214 and 215 by the resilient strips 212 of pressure pad arm 202 (Fig. 18). The other recording head 219 is cut away like the recording head 216.

When the magazine 51 is removed from the recording device 50, the torsion spring 208 urges pressure pad arm 202 rearwardly until the lower arm portion 207 engages pin 211 (Fig. 17), the ultimate position of the resilient strips 212 being within the plane of rear wall 201 of magazine 51, permitting hinged cover 171 to be closed and held in the closed position by spring catch 173.

When the magazine 51 is placed upon the recording device 50 and locked thereon by means of handle 189, the recording heads 216 and 219 enter the magazine 51 and engage the magnetic tape 133*a* between their caps 214, 215, 217 and 218 and the resilient strips 212 of pressure pad arm 202 and similar strips on pressure pad arm 203 (Fig. 18).

A reversing control contact arm 224 is pivotally mounted intermediate its ends on a pivot pin 225 fixed to the upper end of an upright post 226. The post 226 is secured by suitable means to the upper side of main apparatus mounting plate 104. At one end, contact arm 224 carries a resilient contact member 227, which may be insulated from contact arm 224, and a movable contact 228 is fixed to the free end of contact member 227. A fixed contact 229 is carried by a bracket 230 secured to the upper side of main apparatus mounting plate 104 by a screw 231. Upon counterclockwise rotation of control contact arm 224, as viewed in Figures 18, 20 and 23, movable contact 228 will engage stationary contact 229.

Figure 2:
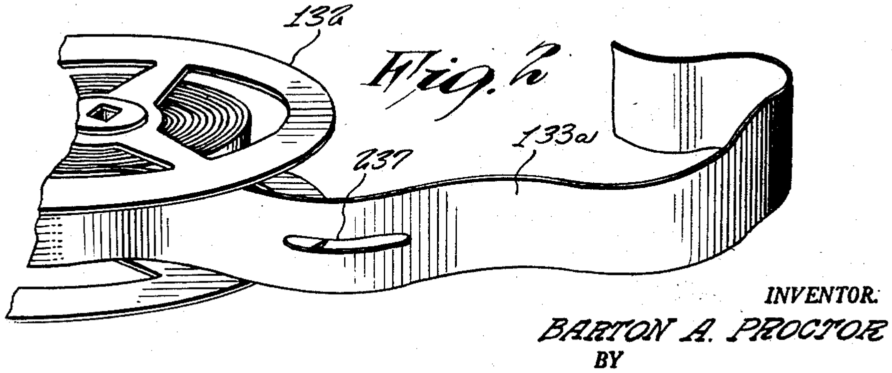
Figure 2 is a fragmentary perspective view of the end portion of a recording tape used in practising the invention, illustrating a control slot formed near the end of the tape.

The free end of contact arm 224 opposite contact 228 is shaped to form two spaced horizontally projecting ears 232. A roller 233 (Fig. 23) is freely revolubly mounted between ears 232 on a pin 234 extending vertically between the ears 232. Roller 233 is provided with a central enlarged portion of rounded peripheral cross-section 235 adapted to project into engagement with a circumferential groove 236 of semicircular cross-section formed in the roller 197. Normally this engagement is prevented by the magnetic tape 133*a* which is interposed between the central portion 235 of roller 233 and the groove 236. As shown in Figure 2, however, the magnetic tape is provided near each end with a control slot 237 which permits the enlarged portion 235 to pass therethrough and engage the groove 236 of roller 197, permitting counterclockwise rotation of reversing control contact arm 224.

Reversing arm 224 is shaped at its point of pivotal connection with pin 225 to provide two horizontally extending ears 238 through which pivot pin 225 passes vertically. A helical torsion spring 239 (Fig. 23) is wound around pivot pin 225 and one end of torsion spring 239 is secured to a screw 240 threadedly fixed to upright post 226. The other end of torsion spring 239 bears against contact arm 224 urging it to rotate in a counterclockwise direction.

When reel 133 is unwinding, and the end of magnetic tape 133*a* is approaching, the control slot 237 formed in the magnetic tape 133*a* arrives at roller 233, the enlarged portion 235 enters slot 237 under the influence of torsion spring 239, and contact 228 moves into circuit closing engagement with fixed contact 229. Contacts 228—229 thereupon cause actuation of control mechanism to stop driving of reel 132 by deenergization of clutch control magnet 123 and to start driving of reel 133 by energization of clutch control magnet 129, thereby reversing the direction of travel of magnetic tape 133*a* and preventing the end of the tape from being unwound from the reel 133.

In order to render the recording device 50 inoperative when there is no magazine 51 mounted thereon in position for use, a switch 240*a* (Figs. 14 and 16) is provided on the upper side of main apparatus mounting plate 104. Switch 240*a* is provided with forwardly extending actuating member 241 which is engaged by a downwardly extending L-shaped bracket 242 (Figs. 13 and 16) secured by a screw 243 to the under side of magazine floor 140. When the magazine 51 is locked in position on the recording device 50, the switch 240*a* is actuated by bracket 242 to render the recording device 50 operative. When the magazine 51 is removed from the recording device 50, switch 240*a* is actuated to prevent operation of recording device 50.

A centrally located downwardly extending locking member 244 (Fig. 13) is fixed to the under side of magazine floor 140 and prevents upward movement of the front portion of the magazine when the magazine 51 is locked in position for use on recording device 50. The locking member 244 is apertured at 245 and is secured to magazine floor 140 by screws 246. A cooperating locking member 247 is secured to the upper surface of main apparatus mounting plate 104 by screws 248. A coupling member 249 extends forwardly from locking member 247 and is arranged to enter the aperture 245 of locking member 244 when the magazine 51 is in working position on recording device 50. In addition, the coupling member 249 includes disengageable electrical connections which extend through a suitable cord or cable 250 to the control apparatus. These electrical connections cooperate with contact members carried on the under side of magazine floor 140 and which extend to a switch whose operation is described below.

The magnetic tape 133*a*, in the embodiment of the invention herein illustrated, is provided with eight vertically spaced longitudinally extending horizontal recording areas (Fig. 26), whose center lines may be individually selectively engaged by the recording caps 214—215 and 217—218 of recording heads 216 and 219, respectively.

Figure 42:
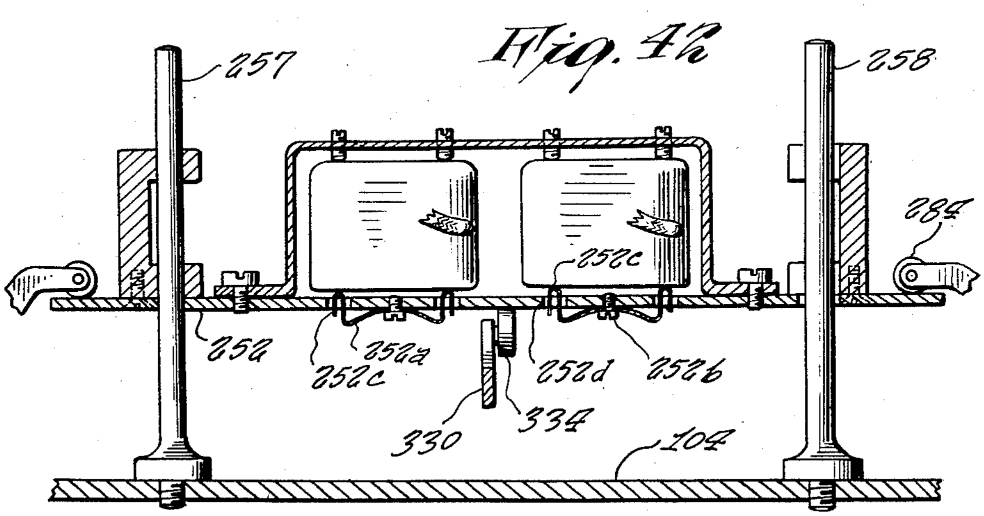
Figure 42 is an enlarged elevational view, partly in section, taken along the line 42—42 of Figure 28, showing the recording head carriage.

The recording heads 216 and 219 (Fig. 19) are adjustably mounted on a transversely extending recording carriage floor member 252, being secured by a strap 253 which is held at its ends by screws 254 threaded into carriage floor member 252. A group of four adjusting screws 253*a* (Fig. 20) is arranged above each of the recording heads 216 and 219. The recording heads 216 and 219 are each supported by and press downwardly on a resilient supporting member 252*a* (Fig. 42) which is secured to the under side of recording head carriage floor member 252 by a screw 252*b*. The bent back ends 252*c* of each resilient supporting member 252*a* extend upwardly through slots formed in carriage floor member 252 and engage the lower surfaces of the recording heads 216 and 219. By suitable adjustment of the screws 253*a*, the recording caps may be aligned with the center lines of the vertically spaced recording areas on the magnetic tape 133*a*. The four adjusting screws 253*a* permit each entire recording head to be vertically displaced as a unit, and to be tilted in any desired direction with respect to a horizontal plane. Flexible cords 255 (Figs. 18 and 28) connect the recording heads 216 and 219 to the electrical circuits of the recording device.

The recording head carriage, designated generally as 256 (Fig. 28), is vertically slidable, being guided by uprights posts 257 and 258 fixed to the upper side of main apparatus mounting plate 104. The carriage 256 comprises a C-shaped block 259 with vertically spaced horizontally extending arm portions 260 and 261, the arms 260 and 261 having vertically aligned apertures formed therein for sliding engagement with upright guide post 257. The C-shaped block 259 is fixed to carriage floor member 252 near one end thereof. Fixed to carriage floor member 252 near its opposite end, is another C-shaped block 262 with vertically spaced arm portions 263 and 264 having vertically aligned slots formed therein for sliding engagement with upright guide post 258. The slots in arm portions 263 and 264 of block 262 permit longitudinal expansion and contraction of carriage floor member 252 due to variations in ambient temperature without danger of causing the carriage to bind or otherwise prevent free vertical sliding movement along upright guide posts 257 and 258.

C-shaped block 259 carries a rearwardly projecting pin 265 and C-shaped block 262 carries a similar rearwardly projecting pin 266.

A pair of step members 267 and 268 (Fig. 29) are disposed behind recording carriage 256 and have flat bottom edges which rest on rollers 269 mounted in brackets 270 secured to main apparatus mounting plate 104. By sliding movement of the step members 267 and 268 on their supporting rollers 269, the pin 265 extending from C-shaped block 259 may be selectively positioned to rest on any of the horizontal step surfaces 271 of step member 267. Similarly, the pin 266 projecting from C-shaped block 262 may be selectively positioned to rest on any of the horizontal step surfaces 272 of the step member 268.

The step members 267 and 268 are held in fixed spaced relationship by a recording carriage control bar 273, being secured thereto by screws 273*a*. The spacing between the vertical step surfaces 274 of step member 267 and the vertical step surfaces of step member 268 is the same as the spacing between the centers of the pins 265 and 266 which project rearwardly from carriage 256. The levels of the horizontal step surfaces 271 and 272 of step members 267 and 268, respectively, are the same for each step where their corresponding vertical surfaces are positioned for engagement with the pins 265 and 266. In this manner, by moving carriage control bar 273 to the left as viewed in Figure 29, the carriage 256 will be permitted to drop successively from step to step, being supported at each position by engagement with the pins 265 and 266 with the horizontal step surfaces 271 and 272, respectively, of step members 267 and 268.

The vertical spacing of the horizontal step surfaces 271 and 272 corresponds with the vertical spacing between the center lines of the recording areas on the magnetic tape 133*a*, as shown in Figure 26. Accordingly, eight steps are provided on each of the step members 267 and 268 and with two projecting pins 265 and 266 resting on corresponding steps of each step member, the recording caps 214, 215, 217 and 218 (Fig. 21) will be aligned with the center of the corresponding one of recording areas designated as lines 1 to 8 (Fig. 26).

An indicator pointer 275 is carried by carriage control bar 273 and cooperates with a fixed scale 276 marked on an index plate 277 secured to upper cover 60 of the recording device 50 by screws 278. Index pointer 275 extends through a slot 279 formed in upper cover 60, and it indicates in conjunction with scale 276 the longitudinal position of carriage control bar 273, and hence indicates which of the horizontal step surfaces 271 and 272 of step members 267 and 268, respectively, is in engagement with pins 265 and 266. This in turn corresponds to one of the center lines of the recording areas shown in Figure 26. It is thus always possible to determine which one of the eight recording areas of magnetic tape 133*a* is in active engagement with the recording heads 216 and 219.

Figure 27:
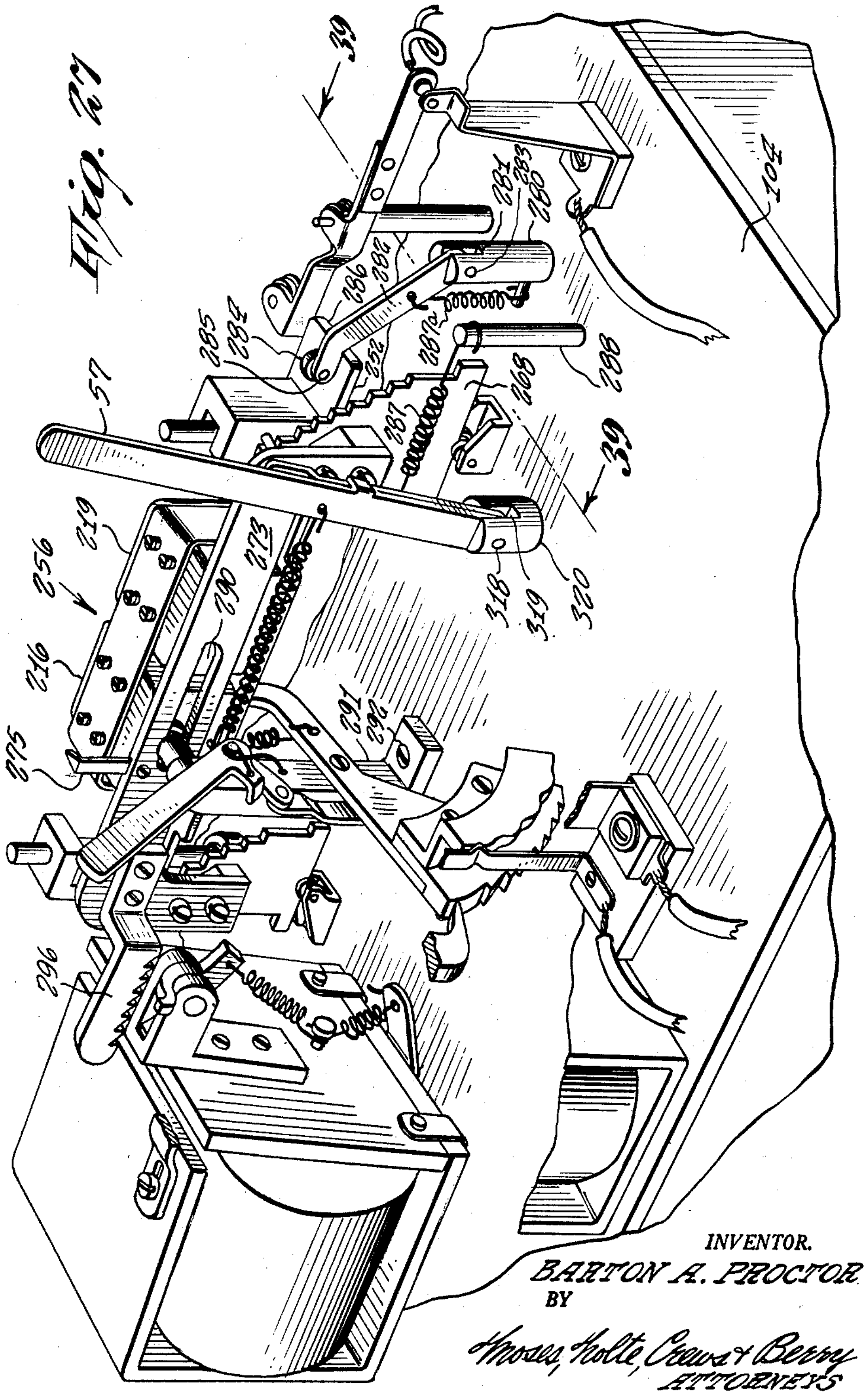
Figure 27 is a fragmentary rear perspective view showing the manual and electromagnetic mechanism for lowering the recording heads successively from one recording area to the next.

A pair of symmetrically arranged upright posts 280, one of which may be seen in Figure 27, are disposed in proximity to the ends of recording head carriage 256, the posts 280 being secured to the upper side of main apparatus mounting plate 104. The upper ends of posts 280 are slotted as indicated at 281. A pair of arms 282 are pivoted at their ends in slots 281 by pivot pins 283. Each of the two arms 282 carries a roller 284 mounted adjacent to its free end on a pin 285. The rollers 284 bear downwardly on the upper surfaces 286 of projecting end portions of carriage floor member 252. The rollers 284 are yieldingly pressed into engagement with the upper surfaces 286 by helical tension spring 287*a*. The carriage 256 is thus lowered by one step each time that the carriage control bar is moved to the left as viewed in Figure 27 through a distance equal to the width of one of the horizontal step surfaces 271 and 272, being urged downwardly by the spring pressed rollers 284. A helical tension spring 287 has one end secured to an upright post 288 and the other end secured to a pivoted lever 321 (Fig. 30) described below. The tension spring 287 acting through lever 321, urges carriage control bar 273 to the right as viewed in Figure 27, thereby pressing the vertical sides 274 and 275 of the steps of step members 267 and 268 into engagement with the left hand sides of projecting pins 265 and 266, respectively, of carriage 256. The projecting pins 265 and 266 of recording head carriage 256 are thus held by tension spring 287 and spring pressed rollers 284 in engagement both with the vertical sides 274 and 275 and with the horizontal surfaces 271 and 272 of a selected one of the steps of step members 267 and 268, respectively, positioning the recording heads in operative engagement with one of the corresponding vertically spaced recording areas on magnetic tape 133*a*.

Figures 28, 29, 30:
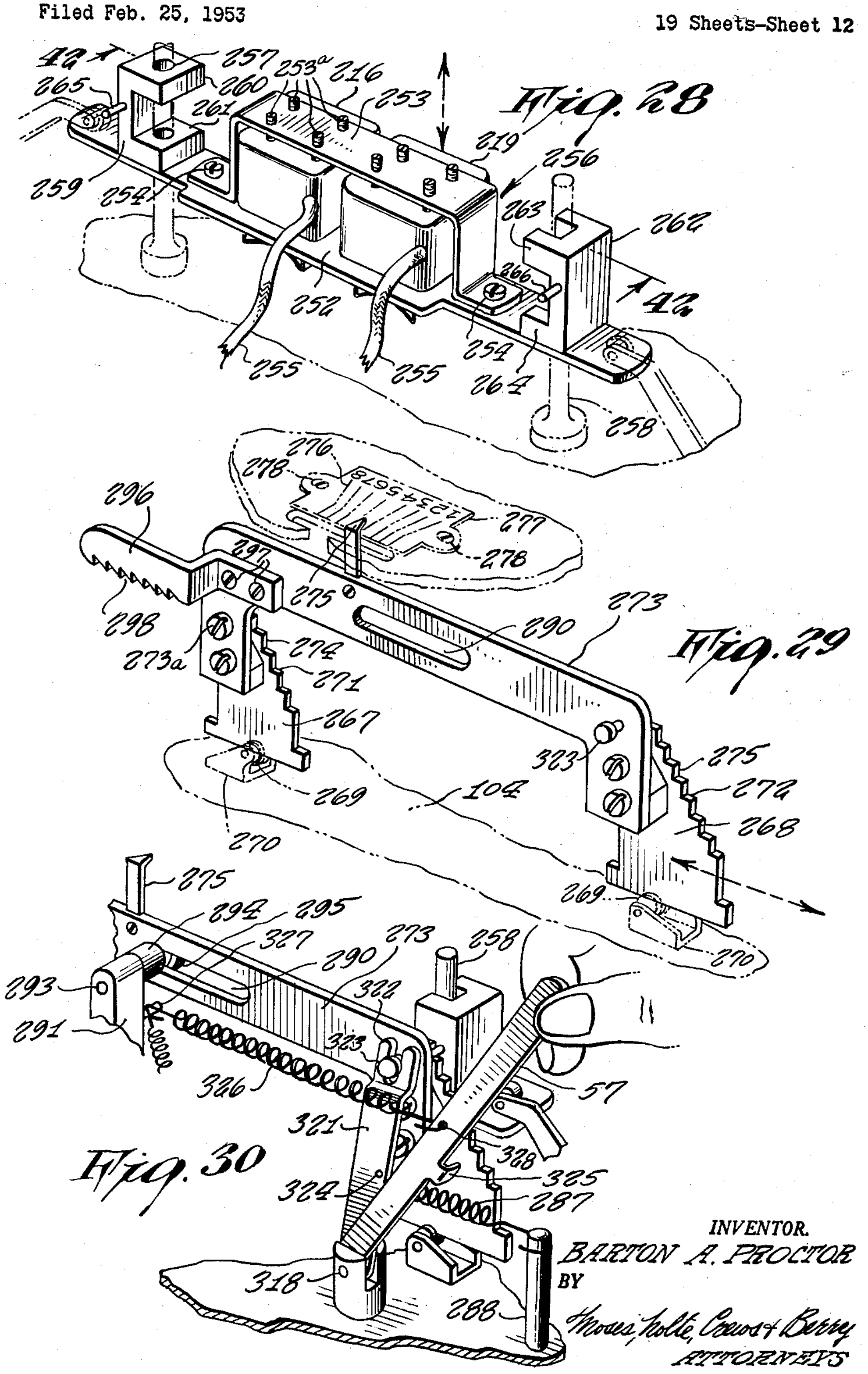
Figure 28 is a rear perspective view of a detail showing the recording heads mounted on a vertically movable carriage.
Figure 29 is a rear perspective view of a position control slide member for vertically positioning the recording head carriage.
Figure 30 is a rear perspective view illustrating how damage to the apparatus by improper manipulation of the manual line control lever is prevented.

Carriage control bar 273 has a longitudinal slot 290 formed therein near its center. An upright bracket 291 is secured to the upper side of main apparatus mounting plate 104 and at its upper end it carries forwardly projecting pin 293 (Fig. 30). Pin 293 projects through slot 290 in carriage control bar 273 and has freely revolubly mounted thereon, on opposite sides of control bar 273, spaced guide rollers 294 and 295 which engage the upper and lower surfaces of slot 290 as well as lateral surfaces of control bar 273 adjacent to the edges of slot 290. Control bar 273 is thus guided for longitudinal movement, the lower surfaces of step members 267 and 268 being supported by rollers 269 as described above.

Mechanism is provided for the lateral displacement of control bar 273 to the left, thereby lowering recording head carriage 256 by one line or more at a time. The lowering mechanism comprises both manually and electromagnetically actuated portions.

The electromagnetic mechanism for lowering recording head carriage 256 comprises a serrated rack member 296 (Figs. 27, 29 and 34) secured to the left hand end of control bar 273 by screws 297. The lower surface of rack member 296 has downwardly directed ratchet teeth 298 formed therein. A carriage lowering electromagnet 299 (Fig. 34) is provided with a clapper type armature 300 which carries a bracket 301 near its upper end secured thereto by screws 302. Bracket 301 is provided with a pair of spaced outwardly projecting ears 303 and a pawl 304 is pivoted therebetween on a pin 305. Armature 300 is pivoted near its lower edge to electromagnet 299 by hinges 306. A helical retractile tension spring 307 has its ends connected between a pin 308 carried by armature 300 and a projecting lug 309 fixed to the frame 310 of electromagnet 299. Armature 300 is thus urged outwardly away from electromagnet 299 by the action of retractile spring 307.

A bracket 311 is adjustably secured to the upper side of the electromagnet 310 by a screw 312 which passes through an elongated slot 313 in bracket 311. A helical tension spring is connected at one end through a hole 315 formed in a projection of pawl 304 and at its other end is connected to pin 308 fixed to armature 300. The tension spring 314 yieldingly urges pawl 304 to rotate in a clockwise direction on pivot pin 305 as viewed in Figure 36. With the armature 300 in its retracted position as shown in Figure 36, this rotation is prevented by an upwardly and laterally extending arm portion 316 of pawl 304 which engages a fixed projection 317 of bracket 311.

Figures 34, 35, 36, 37, 38, 39:
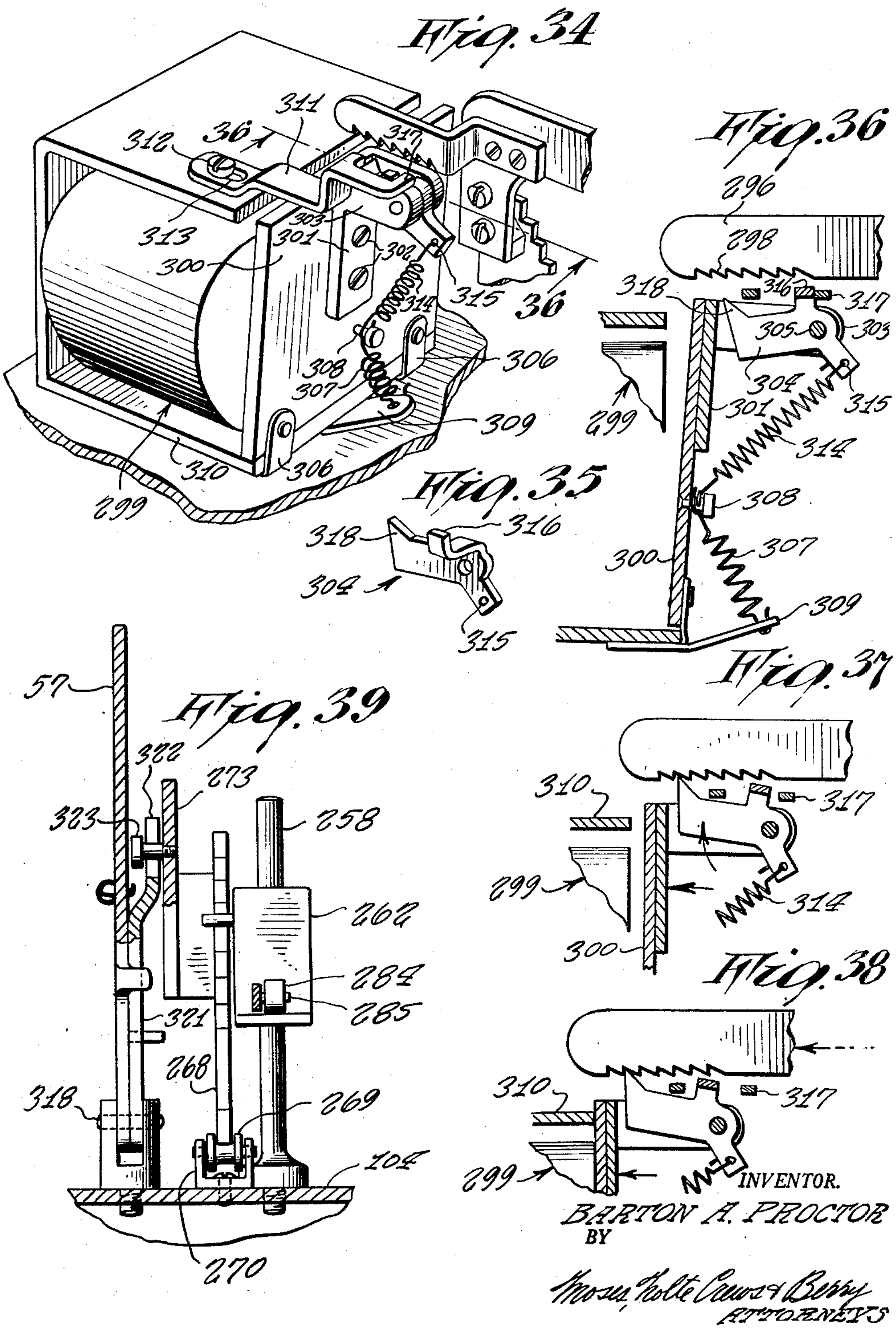
Figure 34 is a fragmentary perspective view showing a detail of electromagnetically actuated mechanism for lowering the recording head carriage.
Figure 35 is a perspective view of a detail, showing a pawl member used in Figure 34.
Figure 36 is a fragmentary view, partly in sectional elevation, taken along the line 36—36 of Figure 34, showing the recording carriage lowering mechanism of Figure 34, with the electromagnet in inactive position.
Figure 37 is a fragmentary view similar to Figure 36, showing the electromagnet in partially actuated position.
Figure 38 is a fragmentary view similar to Figure 36 with the electromagnet in fully actuated position.
Figure 39 is an enlarged view in elevation, partly in section, taken along the line 39—39 of Figure 27, looking in the direction of the arrows.

Upon energization of electromagnet 299, armature 300 is attracted and moves through an intermediate position shown in Figure 37 into its fully actuated position shown in Figure 38. As it moves toward its fully actuated position arm 316 of pawl 304 becomes disengaged from projection 317 of bracket 311, thereby permitting pawl 304 to rotate in a clockwise direction on its pivot pin 305. In so rotating, its free pointed end 318 moves upwardly and into engagement with one of the downwardly directed ratchet teeth 298 of rack member 296, and in its continued movement into its fully actuated position shown in Figure 38, moves the rack member and carriage control bar 273 to the left by a distance slightly greater than the spacing between adjacent teeth 298 of rack member 296, this spacing being equal the width of the horizontal surfaces 271 and 272 of step members 267 and 268. This movement of carriage control bar 273 to the left, allows the projecting pins 265 and 266 of recording head carriage 256 to drop to the next lower, thereby bringing the recording heads 216 and 219 into operative engagement with the next lower recording area on magnetic tape 133*a*.

The recording carriage may also be independently lowered by manual operable means. The manually operable recording head carriage lowering lever 57 which projects upwardly through slot 59 (Fig. 1) in the upper cover 60 of recording unit 50, is pivoted at its lower end to a pivot pin 318 (Fig. 27) which traverses a slot 319 formed in the upper end of a short upright post 320. A lever 321 has its lower end similarly pivoted to pin 318 and its bifurcated upper end 322 (Fig. 30) embraces a headed pin 323 fixed to carriage control bar 273.

Lever 321 is urged to rotate in a clockwise direction as viewed in Figure 30, by the tension spring 287 which has one end secured to upright post 288, the other end passing through a hole 324 formed at one side of lever 321. The tension spring 287 acting on hole 324 thus urges the bifurcated end 322 of lever 321 to the right, as viewed in Figure 30, and the headed pin 323 fixed to control bar 273 is urged to the right by its engagement with bifurcated end 322 of lever 321. This, in turn, urges control bar 273 and the step members 267 and 268 secured thereto to the right, as described above.

Manually operable lever 57 has a forwardly projecting lug 325 formed at the right side thereof, and lug 325 will engage lever 321, forcing it to the left against the yielding action of tension spring 287 when lever 57 is moved by hand in a counterclockwise direction, as viewed in Figure 30. A helical tension spring 326 has one end connected to a fixed pin 327 carried by upright bracket 291, the other end of tension spring 326 passing through a hole 329 formed at the left side of manually operable lever 57. Lug 325 thus normally engages lever 321, and lever 321 may be rotated in a counterclockwise direction about pivot pin 318 by moving the upper end of lever 57 to the left. Movement of lever 57 to the left displaces control bar 273 to the left allowing recording head carriage 256 to drop down one or more steps or recording lines according to the amount of such leftward displacement. Movement of manual control lever to the right, however, would tend to force one of the vertical sides 274 and 275 of step members 267 and 268 into engagement with projecting pins 265 and 266 of carriage 256. Application of sufficient force in this direction would tend to bend pins 265 and 266, or otherwise damage the apparatus. Such damage is prevented, however, because movement of manually operable lever 57 to the right, merely disengages lug 325 from the right hand side of lever 321 so that no force may be manually applied to projecting pins 265 and 266 of carriage 256.

Mechanism is also provided for elevating recording head carriage 256 one line or more at a time. The elevating mechanism comprises both manually and electromagnetically actuated portions.

Figures 31, 32, 33:
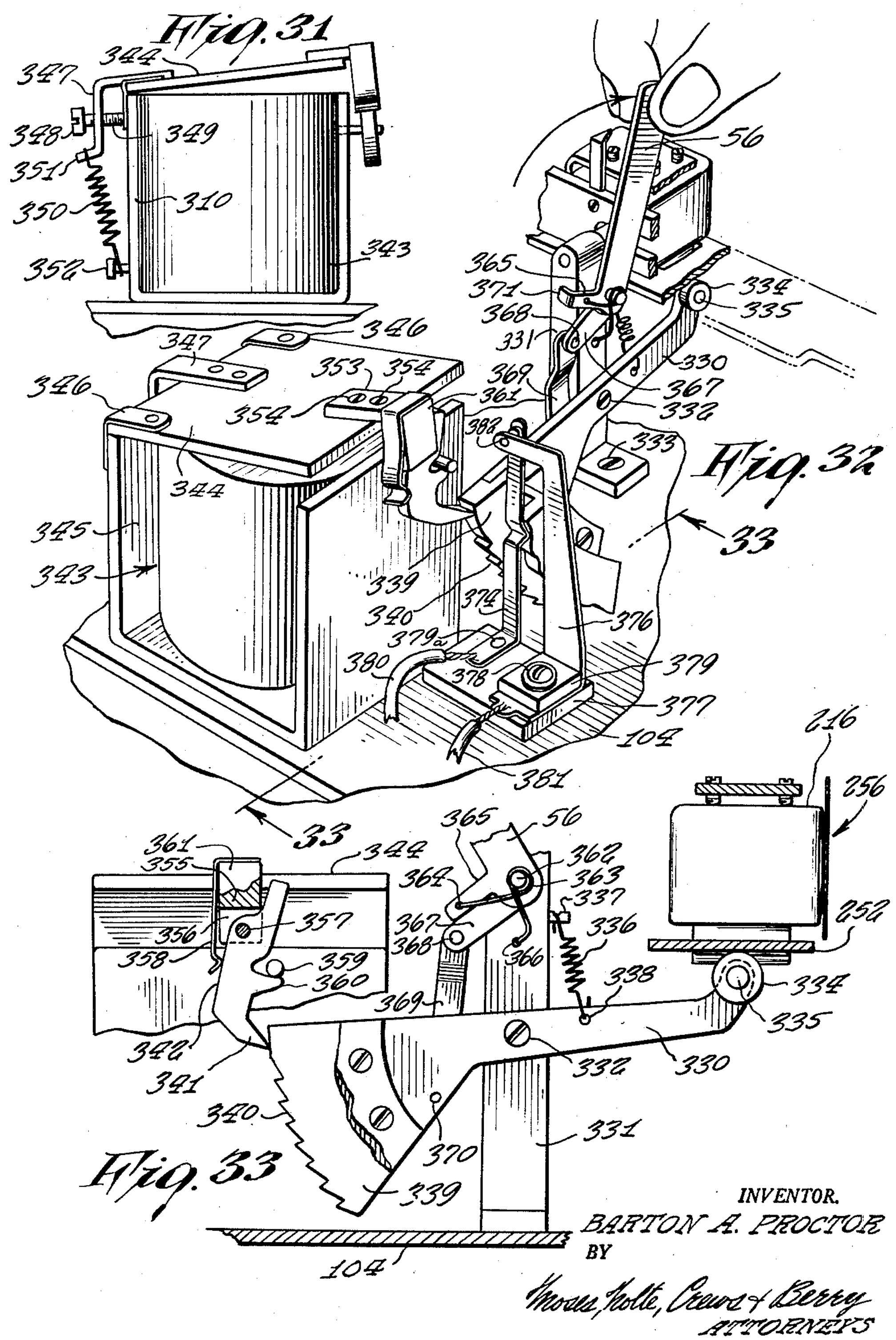
Figure 31 is a side view of an electromagnet for elevating the recording head carriage.
Figure 32 is a fragmentary perspective view showing the manually operable and electromagnetically actuated devices for elevating the recording head carriage.
Figure 33 is a side view taken along the line 33—33 of Figure 32, showing the recording head elevating mechanism.

The elevating mechanism comprises a lever 330 (Fig. 33) pivoted intermediate its ends to an upright bracket 331 by a pivot screw 332. Upright bracket 331 is secured to the upper side of main apparatus mounting plate 104 by a screw 333 (Fig. 32). At its forward end, lever 330 carries a roller 334 freely revolubly mounted on a laterally projecting pin 335. A helical tension spring 336 has its upper end connected to a fixed forwardly projecting pin 337 carried by upright bracket 331 and its lower end passes through a hole 338 formed near the upper edge of lever 330. Tension spring 336 urges lever 330 to rotate about pivot screw 332 in a counterclockwise direction as viewed in Figure 33, thereby maintaining roller 334 in engagement with the under side of recording head carriage floor member 252.

The rear end of lever 330 terminates in an arcuate sector 339 which has ratchet teeth 340 formed on the periphery thereof. The pointed end 341 of a pawl 342 is engageable with ratchet teeth 340 in response to the energization of a carriage elevating electromagnet 343 (Fig. 32). The elevating electromagnet 343 comprises an armature 344 connected to its frame 345 by hinge members 346. Adjacent to its hinged edge, armature 344 has a downwardly extending bracket 347 (Fig. 31) fixed thereto. A backstop screw 348 is threaded through bracket 347 and its end engages the frame 345 of electromagnet 343 at 349, limiting counterclockwise rotation of armature 344 as viewed in Figure 31. A helical retractile tension spring 350 has its upper end connected to a projection 351 of bracket 347 and its lower end connected to a fixed headed pin 352 carried by the frame 345 of electromagnet 343. Tension spring 350 yieldingly urges rotation of armature 344 on hinges 346 in a counterclockwise direction as viewed in Figure 31, this rotation being limited by back-stop screw 348, as noted above.

At its outer end, armature 344 has a bracket 353 (Fig. 32) fixed thereto by screws 354. Bracket 353 comprises an outer downwardly extending portion 355 (Fig. 33) cut away at 356 to receive pawl 342. Pawl 342 is pivoted to downwardly extending portion 355 of bracket 353 by a pivot pin 357. Pawl 342 is urged to rotate on pivot pin 357 in a counterclockwise direction as viewed in Figure 33, by a leaf spring 358. In the deenergized condition of elevating electromagnet 343, pawl 342 is held displaced in a clockwise direction by fixed projecting pin 359 carried by the frame 345 of electromagnet 343, the pin 359 engaging a projection 360 provided on pawl 342 for this purpose. Being thus held displaced, the end 341 of pawl 342 will not interfere with the upward movement of ratchet teeth 340 which accompanies actuation of the carriage lowering mechanism. A cover member 361 (Fig. 32) holds pawl 342 against longitudinal movement on pivot pin 357.

When elevating electromagnet 343 is energized, pivot pin 357 moves downwardly with the outer end of armature 344 and frees pawl 342 from engagement with fixed pin 359, permitting it to rotate on its pivot pin 357 in a clockwise direction so that its pointed end 341 may engage one of the ratchet teeth 340 on arcuate sector 339, forcing the tooth downwardly for rotation of lever 330 in a counterclockwise direction on pivot screw 332 as viewed in Figure 33. This counterclockwise rotation of lever 330 raises roller 334 which accordingly elevates recording head carriage 256. The pawl 342 moves downwardly through a distance sufficient to displace any one of the teeth 340 of arcuate sector 339 through a distance slightly greater than the distance required to raise carriage 256 by the height of one of the vertical sides 274 and 275 of the steps of step members 267 and 268. Upon the carriage 256 being thus raised, the tension spring 287 acting through lever 321 urges control bar 273 to the right as viewed in Figure 30, this movement being limited by engagement of the vertical sides 267 and 268 of the steps of step members 267 and 268 with the projecting pins 265 and 266 of carriage 256. For a downward movement of one tooth of the arcuate sector 339, the carriage 256 will be elevated by one step, corresponding to one line of recording area on magnetic tape 133*a*.

The recording head carriage may thus be lowered by one line at a time by successive actuations of electromagnet 299, or may be elevated by one line at a time by successive actuations of electromagnet 343.

Figures 40, 41:
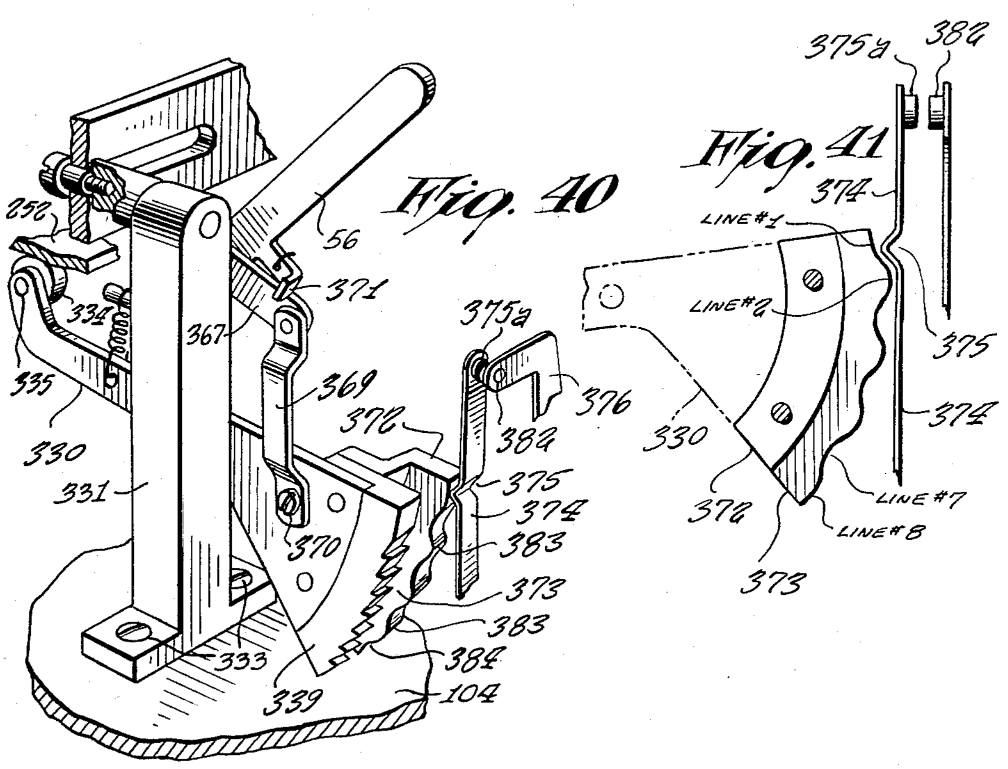
Figure 40 is an enlarged perspective view of a detail showing the directional control contact mechanism which operates in conjunction with the recording head carriage elevating and lowering mechanisms.
Figure 41 is an enlarged side view showing the directional control contacts and the control cam therefor illustrated in Figure 40.

Manually operable means are also provided for elevating the recording head carriage 256. The manually operable recording head carriage elevating lever 56 which projects through the slot 58 (Fig. 1) in upper cover 60 of recording device 50, is pivoted near its lower end to a pivot pin 362 (Fig. 33) fixed to the upright bracket 331. A helical torsion spring 363 is mounted on pivot pin 362 and one end engages a hole 364 formed in a projecting arm portion 365 of lever 56, the other end of torsion spring 363 engaging a hole 366 formed in upright bracket 331. Torsion spring 363 yieldingly urges lever 56 in a counterclockwise direction about pivot pin 362 as viewed in Figure 33. A lever 367 has one end pivoted to upright bracket 331 by pivot pin 362 and the other end pivotally connected at 368 to the upper end of a link member 369. The lower end of link member 369 is pivoted to lever 330 at 370. The end of arm portion 365 of lever 56 is formed with a lateral projection 371 (Fig. 40) arranged for engagement with lever 367 upon counterclockwise rotation of lever 56 as viewed in Figure 32 or clockwise rotation as viewed in Figure 40, to force link member 369 downwardly. This movement elevates roller 334 and recording head carriage 256, which remains in the elevated position by movement of step members 267 and 268 to the right as viewed in Figure 27 under the influence of tension spring 287.

Clockwise rotation of lever 56, merely disengages lateral projection 371 from contact with the upper surface of lever 367 and has no other effect whatever upon the carriage elevating mechanism.

Disposed on lever 330 and extending parallel to arcuate sector 339 (Figs. 40 and 41), is an arcuately shaped cam member 372 formed with an undulatory peripheral cam surface 373. An upright leaf spring type contact member 374 is formed with projecting portion 375 therein which acts as a cam follower and engages the undulatory cam surface 373.

The leaf spring 374 is provided adjacent to its upper end with a movable contact **375*a*. A relatively rigid contact arm 376 of inverted L-shape is secured to a block (Fig. 32) of insulating material 377 by a screw 378 which clamps the lower horizontal portion of inverted L-shaped contact arm 376 between a further block 379 and the insulating block 377. The insulating block is secured by any convenient means (not shown) to the upper side of main apparatus mounting plate 104. The upright leaf spring movable contact member 374 is secured to insulating block 377 by any suitable fastening means such as a drive screw or a rivet 379*a***.

Figure 50:
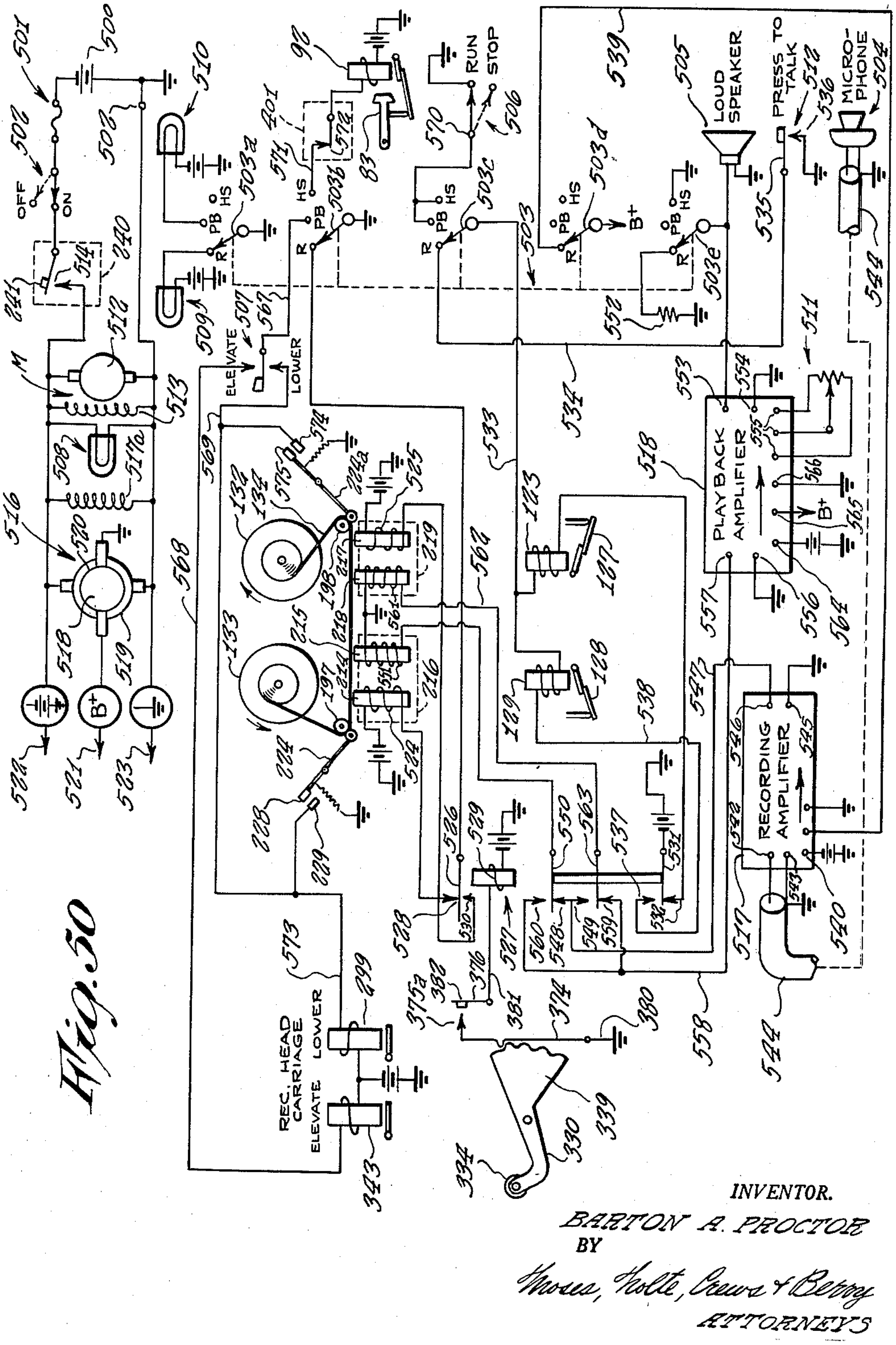
Figure 50 is a schematic electrical circuit diagram of the complete recording and reproducing device, including the remote control unit.

Electrical conductors 380 and 381 of suitably insulated wire extend from the lower ends of the leaf spring member 374 and inverted L-shaped contact arm 376 to appropriate control mechanism (Fig. 50). At its upper laterally projecting end, the inverted L-shaped contact arm 376 is provided with a relatively fixed contact 382 which enters into circuit closing engagement with the movable contact **375*a* when the leaf spring member 374 is moved by engagement between the cam follower portion 375 of leaf spring member 374 and one of the hill portions 383, of cam member 373 which extends radially outwardly relative to the valley portions 384 of undulatory cam surface 373. When cam follower portion 375 of leaf spring member 374 is disposed in radial alignment with a valley portion 384 of undulatory cam surface 373, the spring action of leaf spring member 374 causes the contacts 375*a* and 382** to move apart into circuit opening relationship.

Referring now to Figures 43 to 48, means are provided for driving the magnetic tape **133*a* at normal speed when the end of the tape is being approached, particularly while the magnetic tape 133*a* is being driven at high speed in either direction of travel. It is extremely undesirable, for obvious mechanical reasons, to attempt to reverse the direction of travel of magnetic tape 133*a* while the reel driving sprockets 47 and 48 are operating at high speed by reason of the energization of the speed selecting clutch control magnet 92 (Fig. 7). Accordingly, mechanism is provided for causing the magnetic tape 133*a*** to operate at normal speed whenever its direction of travel is about to be reversed.

A pair of symmetrically arranged upright posts 385 and 386 (Figs. 43 and 46) are fixed to the upper side of magazine floor 140. The posts 385 and 386 have speed control switch actuating arms 387 and 388, respectively, pivotally mounted thereon adjacent to the upper ends thereof. The switch actuating arms 387 and 388 are formed with spaced laterally projecting pairs of ears 389 and 390 respectively, vertical shafts 391 and 392 extending between the ears of each pair. Freely revolubly mounted on the vertical shafts 391 and 392 are the tape engaging rollers 393 and 394. A helical torsion spring 395 (Fig. 46) is disposed on upright post 386 and yieldingly urges the switch actuating arm 388 into engagement with the outermost layer 395 (Fig. 43) of magnetic tape **133*a* wound upon the reel, the contact arm 388 being sufficiently narrow to enter freely between the spaced flanges 396 and 397 (Fig. 47) of reel 132**.

The adjacent free ends 398 and 399 (Fig. 46) of switch actuating arms 387 and 388, respectively, are positioned to bear against the projecting actuating button 400 of a switch 401. Switch 401 is mounted in a bracket 402 secured to the magazine floor 140 by a screw 403. When either of the reels 132 or 133 approaches a condition where sufficient magnetic tape 134 has been unwound therefrom, and that the control slot 237 (Fig. 2) formed in magnetic tape **133*a* is about to actuate the tape reversing mechanism, one of the switch actuating arms 387 or 388 will move radially inwardly toward the center of its associated reel 133 or 132, respectively, causing its ends 398 or 399 to press against switch actuating button 400 of switch 401. Sufficient pressure on actuating button 400 of switch 401, causes contacts (not shown) of switch 401 to establish circuit conditions for deenergizing speed selecting clutch control magnet 92, if energized, thereby reducing the driving speed of reels 132 and 133** to normal speed if they had previously been operating at high speed.

After directional reversal has been completed, and a sufficient amount of magnetic tape has been rewound upon the reel which was previously unwinding, then the switch actuating arm 387 or 388 will be displaced through a sufficient distance to restore switch actuating button 400 and switch 401 to their respective normal positions, thereby permitting reenergization of speed selecting clutch control magnet 92, if high speed movement of the tape **133*a*** is called for by the control mechanism.

Figures 46, 47, 48:
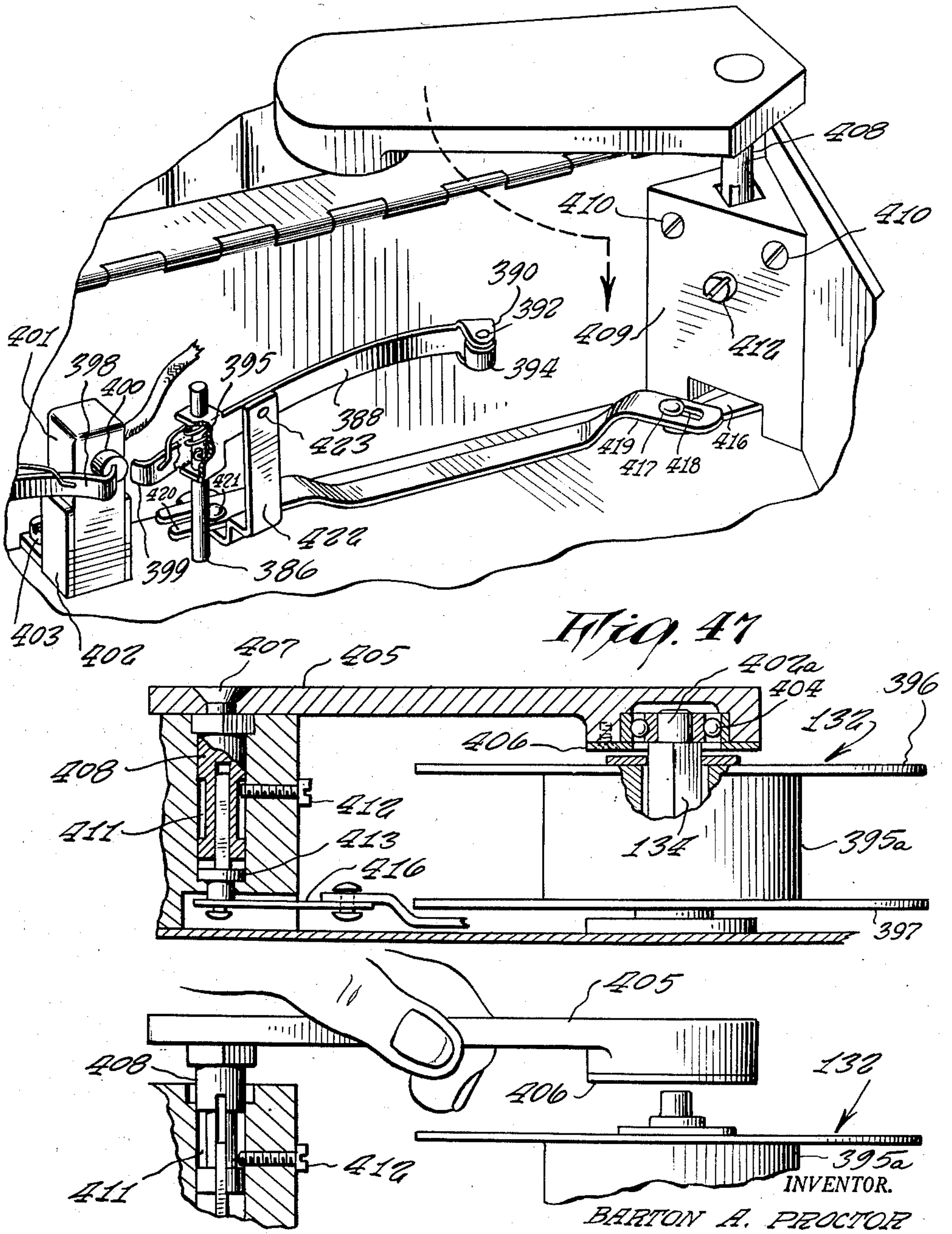
Figure 46 is a fragmentary perspective view showing the reel retaining arm raised and positioned for removal or replacement of a reel, together with the slow speed control arm in retracted position to permit such removal or replacement.
Figure 47 is a sectional view in elevation taken along the line 47—47 of Figure 43 showing the reel retaining arm in lowered position.
Figure 48 is a view similar to Figure 47, partly in section, showing the reel retaining arm in raised position.

Provision is made for the rapid removal or replacement of either or both of the reels 132 and 133. Each of the reel driving shafts 134 and 135 is provided at its upper end with a portion of circular cross-section **402*a* and 403*a*, respectively. Referring to Figure 47 the round upper end 402*a* of shaft 134 which drives reel 132 is engageable with a ball bearing 404 secured in pivoted arm 405 at the outer end thereof by a plate 406. The other end of arm 405 is fixed at 407 to a shaft 408 vertically and rotatably mounted in a corner block 409 secured to a front corner of magazine 51 by screws 410. Shaft 408 is provided with a central portion 411 of reduced cross-section and vertical movement of shaft 408 beyond the limits determined by the reduced portion 411 is prevented by a screw 412 threaded in corner block 409** (Figs. 46 and 47).

A further shaft 413 is rotatably mounted in corner block 409 in axial alignment with shaft 408 and comprises an upwardly extending tongue portion 414 (Fig. 45) of substantially rectangular cross-section which vertically slidably engages a downwardly extending slot 415 formed in shaft 408. The lower shaft 413 remains unaffected by vertical movement of the upper shaft 408, but turns shaft 408 as arm 405 is angularly displaced.

At its lower end, the lower shaft 413 carries an arm 416 fixed thereto for movement therewith. Arm 416 carries a headed pin or rivet 417 which extends upwardly adjacent its outer end and is freely longitudinally movable in an elongated slot 418 formed in a link member 419 adjacent to one end thereof. The opposite end of link member 419 is bifurcated at 420. The bifurcated end 420 of link member 419 slidingly engages a headed pin or rivet 421 extending upwardly from the horizontal arm of an L-shaped bracket 422. The L-shaped bracket 422 is fixed to the speed control switch actuating arm 388 (Fig. 46) near its point of pivotal connection to upright post 386 and adjacent to the upper end of the vertical arm of bracket 422 by riveting, spot welding or the like, as indicated at 423.

Figure 43:
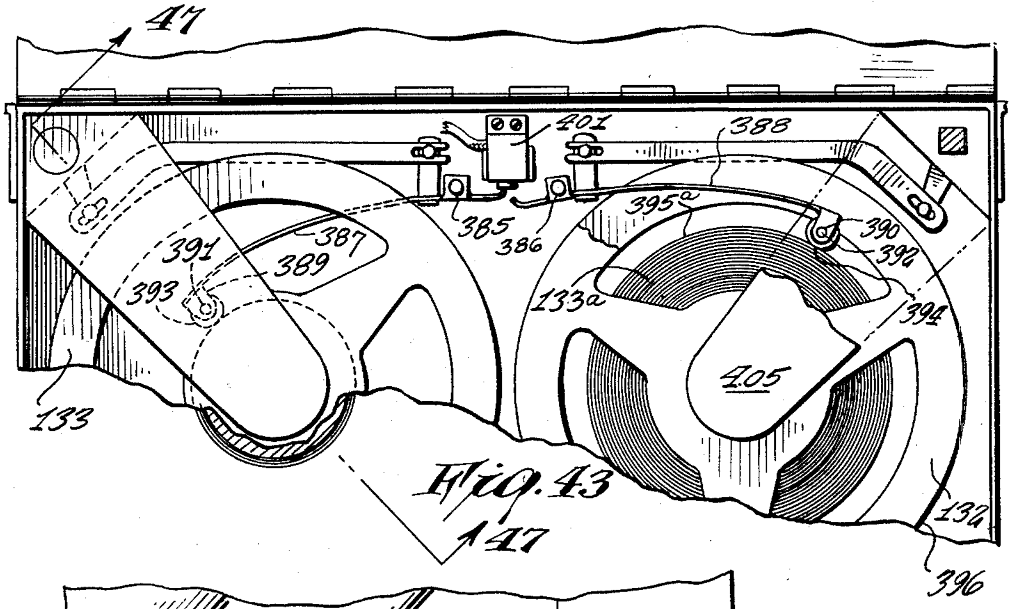
Figure 43 is a plan view, partly broken away, of the magazine with the cover raised, showing contact mechanism for driving the reels at slow speed when approaching the end of the recording medium immediately prior to the reversal of its direction of travel.
Figures 44, 45:
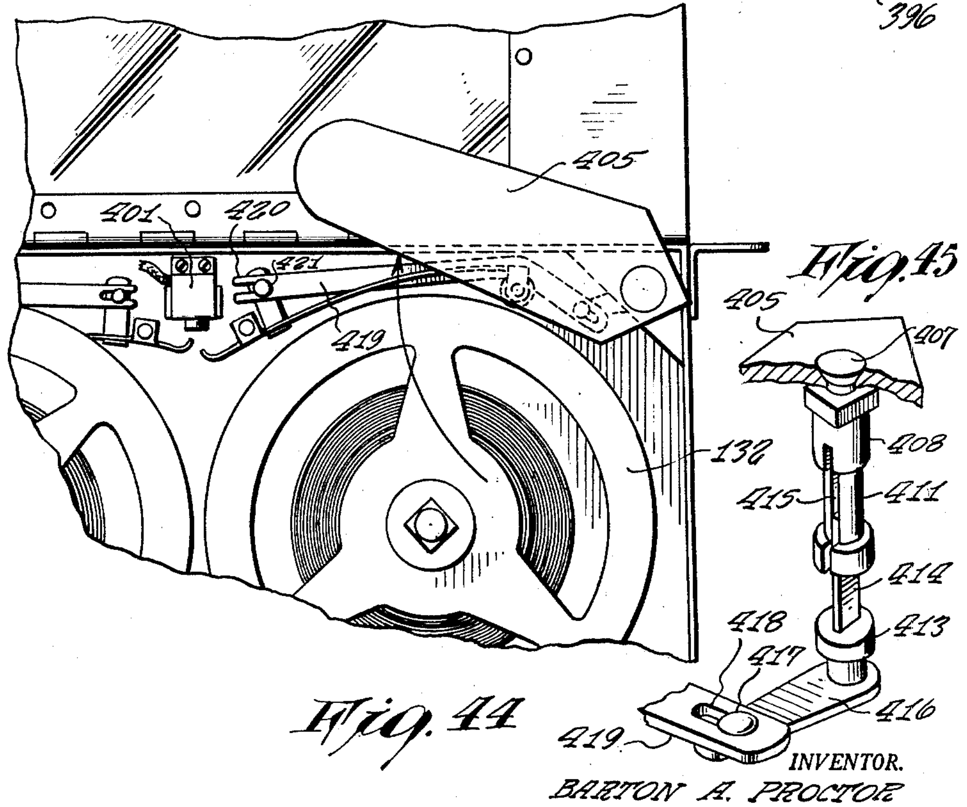
Figure 44 is a plan view similar to Figure 43 showing a reel retaining arm raised and swung to a position permitting removal or replacement of a reel.
Figure 45 is an enlarged perspective view of a detail, showing a vertical shaft which rotates with the reel retaining arm.

When it is desired to remove or to replace a reel, the pivoted arm 405 is raised by hand as shown in Figure 48 and rotated in a counterclockwise direction as viewed in Figure 46 so that it is cleared by the outer edges of the flanges 396 and 397 of reel 132. As shown in Figures 43 and 44, the pivoted arm 405 is turned through a substantial angle when the arm is turned from the normal operating position shown in Figure 43 to the position shown in Figure 44 in which the reel 132 may be removed or replaced. This angular movement causes a corresponding movement of arm 416 fixed to the lower end of shaft 413 which turns with pivoted arm 416. Initially, the headed pin 417 moves to the end of elongated slot 418 whereupon it causes longitudinal movement of link member 419. Link member 419 then moves until headed pin 421 is engaged by the closed end of the bifurcation at 420 whereupon it moves headed pin 421. Headed pin 421, being carried by the lower horizontal arm of the L-shaped bracket 422 fixed to the speed control switch actuating arm 388, causes rotation of speed control arm 388 in a counter clockwise direction as viewed in Figure 43 to the position shown in Figure 44. In the position shown in Figure 44, both the pivoted arm 405 and the speed control switch actuating arm 388, together with the roller 394 at the end of speed control arm 388 are all positioned to clear the flanges of reel 132, permitting its removal or replacement.

Referring to Figures 5 and 6, provision is made for the actuation of a remote indicator (not shown) which will give a visual or other indication at a remote point to show the amount of magnetic tape 133*a* remaining unused at any time, or the particular recording area of the magnetic tape which is in use, or a complete indication of the position of the recording heads 216 and 219 with respect to the magnetic recording medium. The remote indicating device may be conveniently arranged to be actuated by pulses, and a pulsing switch 425 is mounted on the upper side of the main apparatus mounting plate 104 at the rear of the recording device 50. Pulsing switch 425 is provided with an actuating arm 426 pivoted at one end to the switch 425, the free end of actuating arm 426 being provided with a roller 427 arranged for engagement with a camming projection 428 carried by a vertical shaft 429. Vertical shaft 429 is advantageously journaled in a C-shaped bracket 430 fixedly secured to the underside of main apparatus mounting plate 104 by screws 431. A sprocket 432 is fixed to vertical shaft 429 for rotation therewith, being revolubly disposed intermediate the vertically spaced horizontal arms of C-shaped bracket 430. The sprocket 432 is connected by a toothed endless flexible belt to a sprocket 434 fixed by a set screw 435 to driven shaft 67 for rotation therewith. Thus, whenever the motor M is in operation, the pulsing switch 425 is actuated at regularly spaced time intervals. When the vertically driven shaft 67 operates at high speed in response to energization of speed selecting clutch magnet 92, the impulse rate is increased accordingly. Thus the pulse actuated indicator correctly follows the movement of the magnetic tape 133*a* at both high and low driving thereof. The pulsing circuit may be routed through contacts (not shown) which are actuated along with directional selecting contacts which determine the direction of travel of the magnetic tape 133*a* thereby actuating the remote indicator selectively in accordance with the direction of travel of the magnetic tape. Suitable connections may also extend from contacts which operate with the recording head elevating and lowering control contacts to displace the remote indicator vertically.

Figure 49:
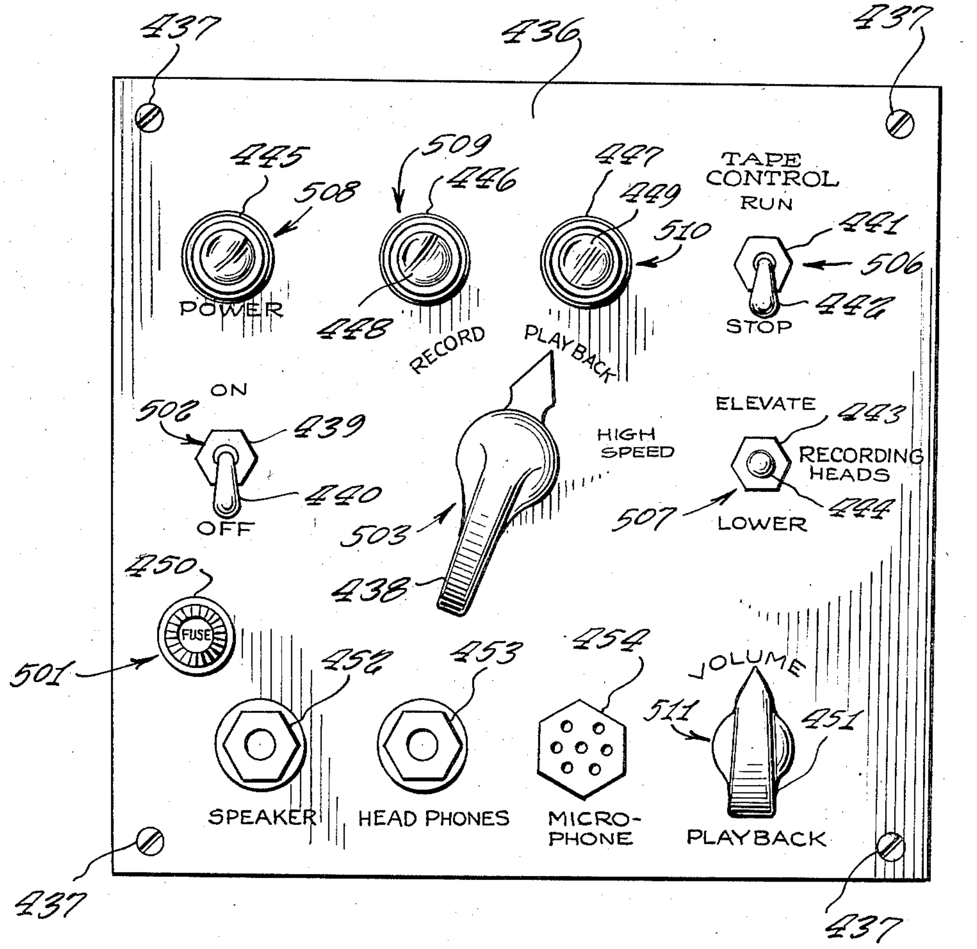
Figure 49 is an elevational view of the front panel of a remote control unit showing a preferred arrangement of control switches and other apparatus mounted thereon.

Referring to Figure 49, there is shown an elevational view of the front panel 436 of a remote control unit. The panel 436 may advantageously be secured to a cabinet or other enclosure (not shown) by suitable fastening means illustratively indicated as four screws 437.

Mounted in the rear of the control panel 436 is a five-pole three-position control switch 503 (Fig. 50) having an operating handle 438. Handle 438 is manually operable to any one of three positions designated "Record," "Playback" and "High Speed" as the handle 438 is turned in a clockwise direction, as viewed in Figure 49. In the "Record" position of handle 438, the machine is arranged to produce a recording on magnetic tape 133*a* of speech or other sounds picked up by a microphone 504 (Fig. 50). In the "Playback" position of handle 438, the machine will reproduce the recorded sounds by means of a loudspeaker 505 (Fig. 50). In its "High Speed" position, the handle 438 causes circuit connections to be established for driving the magnetic tape 133*a* at high speed to some particular longitudinal portion thereof, usually for the purpose of reproducing the signals recorded on such particular portion of the tape, although such portion may be used instead for recording purposes, if desired.

A nut 439 secures a main power switch 502 (Fig. 50) to the control panel 436, the main power switch 502 being provided with an operating handle 440. The handle 440 is selectively manually operable to either of two positions designated "On" and "Off."

A nut 441 secures a tape control switch 506 (Fig. 50) to panel 436. The tape control switch 506 is provided with an operating handle 442 which is selectively manually operable to either of two positions designated "Run" and "Stop."

A similar nut 443 secures a non-locking recording carriage control switch 507 (Fig. 50) to the control panel 436, the carriage control switch being provided with a three-position manually operable self-restoring handle 444 which is normally positioned in a neutral position intermediate upper and lower positions designated "Elevate" and "Lower," respectively. When operated upwardly to the "Elevate" position, handle 444 of switch 507 causes the recording head carriage 256 (Fig. 27) to move upwardly by one line, bringing the recording heads 216 and 219 into operative alignment with the next lower numbered recording area on magnetic tape 133*a* as indicated in Figure 26. When operated downwardly to its "Lower" position, handle 444 of switch 507 causes recording heads 216 and 219 to drop down by one line to the next higher numbered recording area on magnetic tape 133*a*.

A suitable lamp socket 445 is provided on control panel 436 for the main power pilot light 508 (Fig. 50).

A similar lamp socket 446 is provided on control panel 436 for the recording pilot light 509, and a socket 447 is similarly provided for the playback pilot light 510 (Fig. 50).

The lamp sockets 446 and 447 are disposed above the corresponding "Record" and "Playback" positions of switch handle 438 to emphasize the position of switch 503. The recording and playback lamp sockets 446 and 447 are preferably provided with red and green lamp caps 448 and 449, respectively, as indicated.

A suitable fuse holder 450 is mounted on control panel 436 for main power fuse 501 (Fig. 50).

A control handle 451 is provided for a playback volume control 511 (Fig. 50) and is arranged to control the volume of loudspeaker 504 which may be plugged into a jack 452 provided on panel 436 for this purpose.

A jack 453 is provided for use with headphones, and may conveniently include contacts for the connection of an attenuator to reduce the playback volume level when headphones are being used.

The microphone 504 (Fig. 50) may conveniently be plug connected to a jack or receptacle 454 mounted on the front of control panel 436, four conductors being required for the connection both of microphone 504 and a press-to-talk switch 512.

Referring now to the schematic circuit diagram of Figure 50, a source of direct current shown illustratively as a battery 500 has its negative terminal connected to a main power fuse 501 and its positive terminal grounded. The connection of the complete recording and reproducing device to the battery 500 may be conveniently established through a conventional cord and plug arrangement (not shown).

From fuse 501 the negative side of the power supply passes through the main power switch 502 to the motor M, also shown in Figure 5. The motor M is provided with an armature 512 and a shunt field 513. Motor M operates continuously at substantially constant speed whenever switch 502 is closed and a magazine 51 is positioned for use upon the recording device 50, the magazine actuated switch 240a then having its actuating member 241 (Figs. 14 and 16) positioned to effect closure of its contacts 514. Removal of magazine 51 opens contacts 514 and stops operation of motor M, even though the main power switch 502 is in its "On" position.

The main power pilot lamp 508 is lighted whenever motor M is in operation, and a plate supply dynamotor 516 is also in operation for furnishing anode voltage to the recording and playback amplifiers 517 and 518 respectively.

The dynamotor 516 is supported from the under side of main apparatus mounting plate 104 by brackets 455 and screws 456, one such bracket being shown in Figure 6. Dynamotor 516 comprises a shunt field 517a and an armature 518a provided with a low voltage commutator 519 and a high voltage commutator 520. The low voltage commutator is connected to drive armature 518a in multiple with motor M. The high voltage direct current output from commutator 520 has its negative terminal grounded and its high voltage positive terminal extends over a conductor 521 to all points on the drawing shown for simplicity of illustration as being connected to B+. Similarly, power from the negative terminal of source 500 and which is available only during the operation of motor M and dynamotor 516 is supplied via a conductor 522 to all points symbolically indicated as connected to an undesignated battery, connection to the positive terminal of source 500 via a conductor 523, being indicated by the symbol for ground, along with various other ground connections.

The control switch 503 is a five-pole three-position switch, as described above, the "Record," "Playback" and "High Speed" positions being designated "R," "PB" and "HS" at each pole.

In its "Record" position, the uppermost pole 503a of control switch 503 causes the recording pilot light 509 in lamp socket 446 to be lighted, the playback pilot light 510 being extinguished.

The second pole 503b of control switch 503, when in the "Record" position supplies direct current to the erasing or obliterating windings 524 and 525, respectively, of recording heads 216 and 219, these erasing windings being associated with the recording caps or pole faces 214 and 217, respectively, shown in Figure 19. Depending upon the direction of travel of magnetic tape 133a, either winding 524 or 525 is selected for energization by the movable contact 526 of a tape direction relay designated generally as 527. The normally closed contact 528 engages movable contact 526 for energization of recording head erasing winding 524 when the magnetic tape 133a is traveling in the direction indicated by the arrow, the operating winding 530 of relay 527 then being deenergized. When tape 133a is traveling in the direction opposite to that indicated by the arrow, operating winding 529 of relay 527 is energized, and movable contact 526 engages the normally open contact 530 of relay 527 to energize the erasing winding 525 of recording head 219.

The third pole 503c of control switch 503 is arranged, with switch 503 in its "Record" position, to connect the press-to-talk switch 512 associated with microphone 504 for control of the tape driving clutch electro magnets 123 and 129. When tape directional relay 527 is deenergized and the magnetic tape 133a is moving in the direction of the arrow, reel 132 is winding the magnetic tape 133a, and it is then being unwound from reel 133.

Clutch control magnet 123 controls the driving operation of reel 132 and one side of operating winding is connected for energization from the negative terminal of source 500 through a movable contact 531 and a normally closed contact 532 of tape direction relay 527. The other side of the operating winding of reel driving clutch control magnet 123 is connected via a conductor 533 and the pole 503c of control switch 503 and a further conductor 534 to the press-to-talk switch 512. Thus, whenever, press-to-talk switch 512 is operated to close its normally open contacts 535 and 536, clutch control magnet 123 is energized to drive reel 132 and wind magnetic tape 133a thereon, causing the tape 133a to travel left to right as indicated by the arrow.

When tape direction relay 527 is energized, its movable contact 531 engages normally open contact 537 and disengages normally closed contact 532, thereby preventing energization of clutch magnet 123 and preparing clutch magnet 129 for energization over a conductor 538 and the conductors 533 and 534 described above. Thus, with tape direction relay 527 operated, press-to-talk switch 512 causes driving operation of reel 133 to wind the magnetic tape 133a thereon and unwind it from reel 132, thereby causing tape 133a to travel from right to left in the direction opposite to that indicated by the arrow.

The fourth pole 503d of control switch 503, with the control switch 503 in its "Record" position, connects the anode supply from the high voltage commutator 520 of dynamotor 516 over a conductor 539 for the energization of the anode circuits of the usual vacuum tubes (not shown) of recording amplifier 517. Terminal 540 of recording amplifier 517 is provided for the energization of cathode heating circuits within the amplifier from the negative terminal of source 500, as indicated, the cathode heating circuits being continuously energized at all times when the motor M and dynamotor 516 are in operation.

The input terminals 542 and 543 of recording amplifier 517 are connected via a flexible shielded conductor 544 to the microphone 504. Although omitted for simplicity of illustration, this shielded connection may include the microphone jack 454 on control panel 436 (Fig. 49) together with a suitable plug or similar connector. The conductor 534 and a ground connection for press-to-talk switch 512 are also included in a suitable flexible cable along with the shielded conductor, so that the press-to-talk switch 512 may be located in convenient proximity to the microphone.

The output terminal 545 of recording amplifier 517 is shown grounded and the other output terminal 546 is shown connected via a conductor 547 to a normally closed contact 548 of tape direction relay 527 and to a normally open contact 549 of this same relay. With tape direction relay 527 deenergized as shown, the output of recording amplifier 517 is connected through normally closed contact 548 and movable contact 550 to the recording and reproducing winding 551 of recording head 216. Winding 551 of recording head 216 is associated with the recording cap or pole face 215 which engages magnetic tape 133a for impressing a recording thereon when the tape 133a is traveling left to right in the direction indicated by the arrow.

The fifth pole 503e of control switch 503, when in its "Record" position, connects a shunting resistor 552 across the loudspeaker 505 for reducing the acoustic level of the reproduced sounds while recording, thereby eliminating or reducing undesirable effects caused by acoustic feedback from loudspeaker 505 to microphone 504, yet at the same time permitting monitoring of the recorded signals as hereinafter described.

One of the output terminals 553 of playback amplifier 518 is shown connected to loudspeaker 505, the other terminal 554 being grounded for completion of the loudspeaker circuit. A playback volume control 511 mounted on control panel 436 (Fig. 49) is connected to terminals 555 which extend to appropriate points within the playback amplifier 518 in known manner.

The input terminal 556 of playback amplifier 518 is shown grounded and the other input terminal 557 is connected via a conductor 558 to a normally closed contact 559 and a normally open contact 560 of tape direction relay 527. With the tape direction relay 527 released, as shown, the input of playback amplifier 518 is connected to the recording and reproducing winding 561 of recording head 219 via a conductor 562 and movable contact 563 of relay 527 in engagement with normally closed contact 559. In this manner, the loudspeaker reproduces the recorded sounds for monitoring purposes, immediately after they have been recorded on the magnetic tape 133*a*, the volume of the reproduced sounds under recording conditions being reduced, as described above, by the shunt resistor 552.

Power supply terminals 564 and 565 are provided for the energization of the cathode heater and anode circuits, respectively, the power supply terminal 566, which is shown grounded, being common to both the cathode heater and anode energization circuits. It should be noted that the playback amplifier 518 is fully operative at all times when the motor M and dynamotor 516 are running.

The first pole, 503*a*, of control switch 503, when moved to its "Playback" position, causes the recording pilot light 509 to be extinguished and the playback pilot light 510 to be lighted.

The second pole 503*b* of control switch 503, when in its "Playback" position, establishes a circuit from ground via a conductor 567 to the three-position non-locking recording head carriage control switch 507, preparing this switch for operation. When the second pole 503*b* of control switch 503 is moved to its "Playback" position, the circuit from ground to movable contact 526 of tape direction relay 527 is opened, thereby preventing energization of either of the erasing windings 524 or 525 of recording heads 216 and 219. This prevents undesired obliteration of any of the signals recorded on magnetic tape 133*a* during playback operation of the machine.

The recording head carriage control switch 507 is then arranged to energize recording head carriage elevating magnet 343 (Fig. 32) over conductor 568 when switch handle 444 (Fig. 49) is moved upwardly to its "Elevate" position. Each time switch handle 444 is so moved, the recording head carriage 256 steps upwardly with respect to magnetic tape 133*a* by one line to the next lower numbered recording area. Each time switch handle 444 moves downwardly to its "Lower" position, electromagnet 299 (Figs. 27 and 34) is energized via a conductor 569 to drop the recording head carriage to the next higher numbered recording area, as described above. In this manner, the recording head carriage 256 may be moved upwardly or downwardly at will by one line at a time to facilitate the rapid location of a specific desired portion of magnetic tape 133*a* where particular signals have been recorded which it is desired to reproduce.

The third pole 503*c*, of control switch 503, when in its "Playback" position, connects the reel drive clutch control magnets 123 and 129 for control by the tape control switch 506. When switch 506 is in its "Run" position, one or the other of tape drive clutch control magnets 123 and 129 will be steadily energized as determined by the operated or non-operated condition of tape direction relay 527 so that the magnetic tape 133*a* will be in continuous travel in either one direction or the other.

When tape control switch 506 is in its "Stop" position, neither of the tape drive clutch magnets 123 or 129 can be energized, and the magnetic tape 133*a* remains stationary.

If desired, the third pole 503*c* of control switch 503 may be omitted, and the conductors 533 and 534 may then be connected directly to terminal 570 of tape control switch 506. Using this arrangement, the tape may be driven continuously by operating handle 442 of tape control switch 506 upwardly to its "Run" position. When handle 442 of switch 506 is operated downwardly to its "Stop" position, the driving of the tape will be under control of the press-to-talk switch 512 associated with microphone 504 in all positions of the three position multi-pole control switch 503 which will then require only four poles instead of five poles as shown.

The fourth pole 503*d* of control switch 503, when in the "Playback" position, cuts off the anode supply over conductor 539 to the recording amplifier 517. This renders the recording amplifier inoperative and prevents the impressing of a new recording on a previously recorded signal.

The fifth pole 503*e* of control switch 503, when in its "Playback" position, removes the shunting resistor 552 from the circuit of loudspeaker 505 so that the signals being played back are reproduced at full volume. Since recording amplifier 517 is inoperative under playback conditions, sounds picked up by the microphone 504 have no effect on the operation of the machine.

The first pole 503*a* of control switch 503, when in its "High Speed" position, extinguishes both the recording and playback pilot lights 509 and 510 respectively.

The second pole 503*b* of control switch 503, when in its "High Speed" position, energizes speed selecting clutch control magnet 92 (Fig. 7) to raise the clutch arm 77 so that its T-shaped head 83 engages the downwardly directed teeth of high speed clutch member 75, thereby driving the driven shaft 67 at high speed through sprockets 68 and 70 and their interconnecting endless toothed flexible belt 72. With tape control switch 506 in its "Run" position, the magnetic tape 133*a* will be driven at high speed in a direction determined by which one of the two tape drive clutch control magnets 123 or 129, is energized. As the end of the tape is approached, the normally closed contacts 571—572 of switch 401 (Fig. 43) are opened by the action of one of the two switch actuating arms 387 and 388. Either switch actuating arm, as its roller 393 and 394 nears the center of reel 133 or 132, respectively, will cause its end portion 398 or 399 to bear against the actuating button 400 of switch 401, thereby opening its closed contacts 571—572. This deenergizes speed selecting clutch control magnet 92 allowing the T-shaped head 83 of spring pressed clutch arm 77 to move downwardly into engagement with the upwardly directed teeth of normal speed clutch member 76. This causes the magnetic tape 133*a* to be driven at normal speed as the end of the tape is approached and its direction of travel is about to be reversed.

The third pole 503*c* of control switch 503, when in its "High Speed" position, connects the reel drive clutch control magnets 123 and 129 for control by tape control switch 506.

The fourth pole 503*d* of control switch 503, when in its "High Speed" position, maintains the anode supply disconnected from recording amplifier 517 so that the recording amplifier 517 remains inoperative.

The fifth pole 503*e* of control switch 503, when in its "High Speed" position, places a direct short circuit across loudspeaker 505 so that it is muted during high speed operation of the machine.

The tape direction relay 527 is controlled by the contacts 375*a* and 382 (Fig. 40) which open and close in response to the position of the undulatory surfaced arcuately shaped cam surface 373 of cam member 372.

As shown in Figure 50, for the first line of the vertically spaced recording areas, the contacts 375a—382 are open. For line 2, these contacts are closed, operating tape direction relay 527, thereby reversing the direction of travel of magnetic tape 133a from the left to right direction indicated in Figure 50 to the right to left direction opposite to that indicated by the arrow. The circuit changes caused by operation and release of tape direction relay 527 have been described above. Alternate opening and closure of contacts 375a—382 accompanies successive vertical movements of recording head carriage 256 from one line to the next in either direction. Thus, for the odd numbered lines 1, 3, 5 and 7, contacts 375a—382 are open and tape direction relay 527 is released as shown in Figure 50. For the even numbered lines 2, 4, 6 and 8, contacts 375a—382 are closed, operating tape direction relay 527.

As the magnetic tape 133a, travelling in the direction of the arrow of Figure 50, reaches the end of the first line, or uppermost recording area, the control slot 237 (Fig. 2) allows the enlarged central peripheral portion of roller 233 (Fig. 23) to pass therethrough and engage the groove 236 of roller 197, permitting counterclockwise rotation of reversing control contact arm 224 as viewed in Figure 20 and Figure 50. This causes closure of contacts 228 and 229 and energization of recording head carriage lowering magnet 299 via conductor 573 (Fig. 50). Upon the lowering of the recording head carriage 256 in response to the energization of lowering magnet 299, contacts 375a—382 close, operating the tape direction relay 527 to reverse the direction of travel of magnetic tape 133a for the second line, or recording area. As the end of the tape travel in the direction opposite to the arrow in Figure 50 for the second line is reached, contacts 574—575 are closed, these contacts being symmetrically arranged with respect to contacts 228—229 described above. Recording carriage lowering magnet 299 is again energized lowering the recording head carriage 256 to the next lower or third line. Contacts 375a—382 are again opened releasing tape direction relay 527 and magnetic tape 133a resumes travel in the direction of the arrow, as for the first line. As previously described, each time the magnetic tape 133a is about to reverse its direction of travel, if being driven at high speed, it automatically drops to low speed by opening of the contacts 571—572 of switch 401.

OPERATION

*Recording*

In order to make a recording, using the recording and reproducing device of the present invention, an interchangeable magazine 51, preferably having blank unrecorded magnetic tape wound upon its reels 132 and 133, is placed in operating position upon the recording device 50 (Fig. 1). The reel 133 should be full, and the reel 132 should be empty in order that the magnetic tape 133a may initially move from left to right, as indicated by the arrow in Figure 50, in order to obtain full utilization of the first line of recording area.

The magazine 51 is locked in operating position on the recording device 50 by raising the handle 52 (Fig. 1) to its vertical locking position, thus securing the magazine 51 against forward movement. The magazine 51 is held against vertical displacement by the conical members 188 (Figs. 13 and 14) which engage the conical apertures 187 formed in the L-shaped blocks 186 secured to the underside of the magazine floor 140. The magazine 51 is further secured by the cooperating locking members 244 and 247 whose electrical connections complete a control circuit through cord 250 to the slow speed control switch 401 (Figs. 43 and 50) within the magazine 51.

With the magazine 51 in operative position, the recording heads 216 and 219 are pressed into recording and reproducing engagement with the magnetic tape 133a by the pressure pad arms 202 and 203 (Fig. 18).

With the magazine 51 thus in operating position, the reversing control contact arm 224 is prepared to close contacts 228 and 229 in response to the arrival of the control slot 237 (Fig. 2) at roller 197 carried by the magazine 51 as described below. The other symmetrically arranged reversing control contact arm 224a (Fig. 18 is similarly prepared to close its contacts 574—575 (Fig. 50) when the control slot 237 at its opposite end of the magnetic tape 133a arrives at roller 198.

The downwardly directed teeth of the reel driving clutch members 142 and 143 (Fig. 13) are positioned directly above the vertically displaceable two-toothed clutch members 121 and 130, which may be raised into driving engagement therewith by energization of either of the two reel drive clutch electromagnets 123 or 129, respectively (Figs. 10 *and* 50).

The conical points 158 and 159 (Fig. 14) are positioned for engagement with the corresponding camming surfaces 156 and 157 (Fig. 13) of the brake arms 148 and 149 to release the brake of the driven reel.

Thus all instrumentalities within the magazine 51 are arranged to be operated and controlled by the respective cooperating instrumentalities of the recording device 50, and the complete recording device 50—51 is ready for operation.

After the operator has locked the magazine 51 in operating position, he next brings the recording heads 216 and 219 mounted on the recording head carriage 256 into operative alignment with the first and uppermost line of recording area of the magnetic tape 133a (Figs. 26 and 42) by moving the manually operable recording head carriage elevating lever 56 (Fig. 1) rearwardly to the limit of its travel (Fig. 33), or by operation of switch handle 444 of carriage control switch 507 (Fig. 49).

The operator next closes the main power switch 502 by raising its operating handle 440 (Fig. 49) upwardly from the "Off" to the "On" position. This lights the power pilot light 508, starts the motor M (Figs. 5 and 50) for driving the magnetic tape 133a and also starts the dynamotor 516 (Figs. 6 and 50) to supply anode voltage to the recording amplifier 517 and to the reproducing amplifier 518 (Fig. 50). The cathode heating circuits of the two amplifiers 517 and 518 are supplied with low voltage direct current through the main power supply switch 502 (Fig. 50) and magazine switch 240a along with the motor M and the dynamotor 516, thus placing both amplifiers in an energized condition ready for operation.

Driving of the magnetic tape is under control of the press-to-talk switch 512, which energizes either one or the other of the reel drive clutch control magnets 123 or 129 (Figs. 10 and 50) depending upon the vertical position of the recording head carriage 256, as noted below. At the beginning of the recording, with the recording heads 216 and 219 in alignment with the first line of recording area, the tape direction relay 527 (Fig. 50) is released, its winding circuit being open at the contacts 375a and 382. Initially, contacts 375a and 375 are open, since the cam follower portion 375 (Fig. 41) of upright leaf spring contact member 374 is in engagement with the uppermost one of the valley portions 384 of the undulatory cam surface 373 of arcuately shaped cam member 372 fixed to the carriage elevating lever 330, the said lever having been moved to the initial position shown in Figure 3 by rearward movement of manually operable lever 56.

In the starting position, when recording on the first line, the magnetic tape 133a is driven from left to right in the direction of the arrow as viewed in Figure 50, the clutch magnet 123 then being controlled by the press-to-talk switch 512 to drive the empty reel 132 at will and wind the magnetic tape 133*a* progressively thereon.

During recording on the first line, the erasing contacts 524 of recording head 216 is energized through contacts 526—528 of tape direction relay 527 (Fig. 50), thereby obliterating any previously recorded signals, or any other magnetic irregularities which might be present on the tape 133*a*.

During the recording on the first line, the recording and reproducing winding 551 of recording head 216 impresses the signals upon the magnetic tape 133*a*, its associated recording cap or pole face 215 (Figs. 19 and 50) being in alignment with the first or uppermost line of recording area. The recording and reproducing winding 551 is connected through contacts 550—548 of tape direction relay 527 to the output terminal 546 of recording amplifier 517. The input of recording amplifier 517 is connected to microphone 504. Thus, when tape 133*a* is being driven in the direction of the arrow in Figure 50 by actuation of the press-to-talk switch 512, the speech or other acoustic signals picked up by microphone 504 will be recorded. If the magnetic tape 133*a* is stationary, however, during periods when the press-to-talk switch 512 is not actuated, the signals picked up by microphone 504 will not be recorded.

During the recording operation, the energizing circuit for the erasing winding 525 of recording head 219 is open at contacts 526 and 530 of tape direction relay 527 to avoid obliteration of the newly recorded signals.

The recording and reproducing winding 561 of recording head 219 is connected to the input terminal 557 of playback amplifier 518 through the closed contacts 563—559 of tape direction relay 527. The newly recorded signals are amplified by playback amplifier 518 and reproduced by the loudspeaker 505 which is connected to the output terminal 553 of playback amplifier 518. During recording, the volume of the reproduced signals is reduced by the shunting action of the resistor 552 which is connected across the loudspeaker circuit at all times when the switch arm 503*e* of control switch 503 is in the "Record" position.

The recorded signals are thus reproduced at reduced volume immediately after they have been recorded. The slight time delay between the recording and the reproducing of the signals arising from the travel time of magnetic tape 133*a* from recording cap 215 of recording head 216 to the cap 218 of recording head 219 which is used for monitoring reproduction of the recorded signals, results in a delayed side tone. This delayed side tone produces a distinctive echo effect. The reduced volume of the reproduced signals minimizes undesirable effects which would otherwise be produced by acoustic feedback from loudspeaker 505 to microphone 504. The absence of the distinctive echo effect of the side tone from the loudspeaker 505 is immediately noticeable, even though the sound is at greatly reduced volume, thus providing continuous monitoring of the recorded signals. If, for any reason, the signals should fail to be recorded on the magnetic tape 133*a*, their absence would be immediately noted, since the side tone would disappear together with the accompanying echo effect thereby causing an apparent sudden change in the acoustic characteristics of the room in which the recording takes place.

At the end of the first line of recording, the control slot 237 (Fig. 2) arrives at roller 197 and the reversing arm control contacts 228—229 (Fig. 50) close. This energizes recording head carriage lowering magnet 299, dropping the recording head carriage 256 by one step from the first line to the second line as hereinbefore described. As the recording head carriage drops to the second line, lever 330 (Fig. 33) is moved in a counterclockwise direction as viewed in Figure 40, and accordingly the cam follower portion 375 (Fig. 41) of leaf spring 374 changes from engagement with a valley portion 384 of undulatory cam surface 373 into engagement with the adjacent downwardly located hill portion 383, thereby causing closure of contacts 375*a*—382 and operating tape direction relay 527 (Fig. 50) which was in released condition during recording on the first line, to reverse the direction of travel of magnetic tape 133*a* to the proper direction for the second line of recording area.

Upon the operation of tape direction relay 527, the energizing connection for tape drive clutch control magnet 123 via movable relay contact 531 is transferred to tape drive clutch control magnet 129 by opening of relay contacts 531 and 532 and closure of relay contacts 531—537. This transfers tape driving control by the press-to-talk switch 512 from reel 132 to reel 133, thus causing the magnetic tape 133*a* to be wound upon reel 133 and to be unwound from reel 132, thereby reversing the direction of tape travel while recording on the second line.

Each time that the recording head carriage 256 is lowered by one line, the operated or released condition of tape direction relay 527 changes. For the odd numbered lines 1, 3, 5 and 7, the contacts 375*a* and 382 are open, the cam follower portion 375 of leaf spring 374 being in engagement with one of the four valley portions 384 of the undulatory cam surface 373 of arcuately shaped cam member 372 fixed to the carriage elevating lever 330. Accordingly, tape direction relay 527 is released for the odd-numbered lines. For the even numbered lines 2, 4, 6 and 8, the cam follower portion of leaf spring 374 is in engagement with one of the four hill portions 383, and contacts 375*a*—382 are closed, thus operating the tape direction relay 527. With tape direction relay 527 operated, the magnetic tape 133*a* is wound upon reel 133 under control of the press-to-talk switch 512. In this manner, the direction of tape travel reverses repeatedly from line to line until all eight of the lines of recording area have been utilized.

The type of tape direction control mechanism shown and described herein, provides an extremely rapid reversal of the direction of tape travel, each reversal being sufficiently accurately coordinated with the accompanying lowering of the recording head carriage 256 to permit the recording operation to continue uninterrupted and without interference during the instant when the reversal takes place. When the recorded signals are played back, at each instant when the direction of tape travel reverses, there is no disturbance which, for all practical purposes, is audibly noticeable. This feature of the invention is made possible by the rapid action of the recording head carriage lowering mechanism, which is accurately coordinated with the cam surface which controls the condition of tape direction relay 527.

*Reproducing*

When it is desired to reproduce the recorded signals, the handle 438 of manually operable control switch 503 is turned to its "Playback" position indicated in Figure 49. The recording pilot light 509, if previously lighted, is extinguished and the playback pilot light 510 is lighted by the first switch arm 503*a* of switch 503.

The second switch arm 503*b*, except in its "Record" position, disconnects the energizing circuit for the erasing windings 524 and 525 of recording heads 216 and 219, respectively, thereby preventing the obliteration of any previously recorded signals. In its "Playback" position, the second switch arm 503*b* connects the recording head carriage control switch 507 for operation by connecting ground thereto via conductor 567. Thus, during playback operation, the recording head carriage may be elevated or lowered at will by operating the self-restoring handle 444 either to its "Elevate" or "Lower" position as desired, correspondingly elevating or lowering the recording head carriage 256 by one line for each operation of the switch handle 444. The stationary contacts of carriage control switch 507 are connected via conductors 568 and 569 to the recording head carriage elevating and lowering magnets 343 and 299, respectively, to provide this remotely controlled manually operable line positioning feature.

The third switch arm 503*c* of control switch 503 transfers the common reel drive clutch magnet control conductor 533 from connection with press-to-talk switch 512 to the contacts of the tape control switch 506. In order to obtain driving operation of either of the two reels 132 or 133, its handle 442 must be operated upwardly from its "Stop" position to its "Run" position. Conversely, the running of the magnetic tape 133*a* may be stopped at will by operating the switch 442 downwardly from its "Run" position to its "Stop" position.

The fourth switch arm 503*d* of control switch 503, except in its "Record" position, disconnects the anode supply potential from the recording amplifier 517, thereby cutting off the recording amplifier 518 during playback operation of the machine. This prevents the recording of any stray noise or other undesired sounds picked up by microphone 504 during playback operation.

The fifth switch arm 503*e* of control switch 503, in its "Playback" position allows the loudspeaker 505 to operate at full volume. Because microphone 504 is inoperative under playback conditions, no advantage is obtained by reducing the volume of the reproduced sounds.

The tape reversing mechanism operates as previously described for the "Record" position of control switch 503, the magnetic tape 133*a* causing the recording head carriage to drop by one line of recording area as the end of each line is reached. The proper direction of tape travel is determined for each line of recording area as the recording head carriage 256 drops for alignment of the recording heads 206 and 219 with each line by the undulatory surfaced cam controlled contacts 375*a* and 382 which control tape direction relay 527. In this manner, the direction of tape travel during playback operation is always the same as that during recording, and the reproducing of the recorded signals proceeds uninterruptedly from line to line in precisely the same manner as during the recording operation.

*High speed operation*

When it is desired to cause the magnetic tape 133*a* to travel at high speed for rewinding purposes, so that it may be rapidly wound on either reel 132 or 133, as desired, or for rapidly bringing the magnetic tape 133*a* to some desired intermediate position, the control switch 503 is operated to its "High Speed" position by manually turning the switch handle 438, and the tape control switch 506 is closed by raising its handle 442 to the "Run" position (Figs. 49 and 50).

The first switch arm 503*a*, when in its "High Speed" position, opens the circuit of either of the recording or reproducing pilot lights 509 or 510, which may have been previously lighted so that both pilot lights 509 and 510 are extinguished.

The second switch arm 503*b*, when in its "High Speed" position, energizes the speed selecting clutch electromagnet 92 through the contacts 571—572 of switch 401, which are closed, except when either end of the magnetic tape 133*a* is being approached and the control slot 237 is about to reverse the direction of tape travel.

The third switch arm 503*c*, when in its "High Speed" position, places the driving or stopping of the magnetic tape 133*a* under the control of tape control switch 506.

The fourth switch arm 503*d*, when in its "High Speed" position, maintains the recording amplifier 518 in an inoperative condition.

The fifth switch arm 503*e* short-circuits the loudspeaker to prevent the objectionable reproduction of high pitched unintelligible sounds while the magnetic tape 133*a* is being driven at high speed.

The direction of travel of magnetic tape 133*a* is reversed at the end of each line of recording area in the same manner as described above during recording operation.

To bring a particular desired portion of magnetic tape 133*a* into operative position with respect to the recording heads 216 and 219, the control switch 503 is operated to its "High Speed" position, as described above. The tape control switch 506 is then operated to its "Run" position.

The speed selecting clutch electromagnet 92 is thereby energized together with one of the reel drive clutch magnets 123 or 129, and the speed selecting clutch arm 77 is moved upwardly so that its T-shaped head 83 is moved from engagement with the upwardly directed teeth of normal speed clutch member 76 into engagement with the downwardly directed teeth of high speed clutch member 75, thereby driving the magnetic tape 133*a* at high speed. When the particular desired longitudinal portion of magnetic tape 133*a* is reached, tape control switch 506 is opened by lowering its handle 442 to the "Stop" position, thereby stopping the tape at the desired point with respect to the recording heads 216 and 219. The control switch 503 is then operated to its "Playback" position, and the desired line of recording area selected by appropriate manipulation of handle 444 of carriage control switch 507.

The recorded signals at the selected line of recording area and longitudinal portion of magnetic tape 133*a* may then be reproduced by raising the handle 442 of tape control switch 506 to its "Run" position. If desired, a new recording may be impressed upon the magnetic tape 133*a* beginning at the selected portion thereof, by turning the control switch 503 to the "Record" position and operating the press-to-talk switch 512 as previously described.

With the control switch 503 in its "High Speed" position and the tape control switch 506 in its "Run" position, the speed of travel of magnetic tape 133*a* is automatically reduced to normal recording and reproducing speed by the deenergization of speed selecting clutch magnet 92 as the end of the tape is approached and before the control slot 237 causes reversal of the direction of tape travel. This is caused by the actuation of switch 401 to open its normally closed contacts 571—572 upon engagement of its actuating button 400 by the free end 398 or 399 (Fig. 46) of one of the switch actuating arms 387 or 388, respectively. This slowing down of the magnetic tape 133*a* just prior to the reversal of its direction of travel, reduces wear and shock on the driving mechanism.

While I have shown what I believe to be the best embodiments of my invention, I do not wish, however, to be confined to the embodiments shown, but what I desire to cover by Letters Patent is set forth in the appended claims.

What is claimed is:

1. An apparatus of the class described, comprising: a pair of reel members; a magnetic recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means, means for moving said transducing means transversely with respect to said intermediate portion of said recording medium for operative relationship with respect to any one of a plurality of spaced parallel longitudinally extending recording areas thereon; means for sensing the transverse position of said transducing means and means responsive to the transverse position sensing means for actuating said driving means for selecting one or the other of said reel members to be driven by said driving means.

2. An apparatus according to claim 1, in which said means for moving said transducing means comprises: a movable carriage for supporting said transducing means; a staircase-shaped member having a plurality of steps formed therein, means on said carriage engageable with each step for limiting movement of said carriage; and means for producing relative movement between said staircase member and said carriage.

3. An apparatus of the class described, comprising: a pair of reel members; a magnetic recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means, means for moving said transducing means transversely with respect to said intermediate portion of said recording medium for operative relationship with respect to any one of a plurality of spaced parallel longitudinally extending recording areas thereon; and means responsive to the transverse position of said transducing means for actuating said driving means for selecting one or the other of said reel members to be driven by said driving means, a pair of individually releasable brake means each normally applying a frictional drag to one of said reels; and in which said driving means comprises a power driven shaft for each reel and normally disengaged clutch means interposed between each of said shafts and each of said reels, and wherein said selectively operable driving means includes means for simultaneously engaging said clutch means and releasing said brake means for said selected reel and for simultaneously disengaging said clutch means and permitting said brake means to apply said frictional drag to said selected reel.

4. Apparatus according to claim 1, further comprising selectively operable means for driving said selected reel member at an increased speed for rapidly selecting a desired portion of the recording medium, and means responsive to the approach of either end of said recording medium for rendering said increased speed driving means ineffective, said last means comprising resiliently pressed actuating means in engagement with the outermost layer of said recording medium on each of said reels for preventing operation of said driving means at said increased speed whenever the diameter of the outermost layer of said recording medium wound upon either of said reels is less than a predetermined minimum magnitude.

5. An apparatus according to claim 1, further comprising electromagnetically actuated means for moving said transducing means, manually operable means for moving said transducing means, and means normally holding the electromagnetic means disengaged from the transducing means whereby said electromagnetic means is not actuated by operation of said manual means.

6. A detachable magazine for an apparatus of the class described, said apparatus including a main portion comprising two drive shafts each having a displaceable drive member secured thereto, means for selectively displacing each of said drive members, switch means for selectively controlling the displacement of said drive members, and transducing means, said magazine comprising: a pair of reel members; a flexible recording medium in elongated form disposed on said reel members to be selectively wound on one reel member and unwound from the other reel member, said recording medium comprising a portion extending intermediate said reel members; an enclosure for said reel members removably engageable with said main portion, said enclosure having an aperture formed therein permitting said transducing means to be positioned in operative relationship with respect to said intermediate portion of said recording means when said enclosure is engaged with said main portion; two shafts journaled in said enclosure, each shaft rotatably supporting one of said reel members, each shaft having a driven member carried thereby exteriorly of said enclosure and disposed for driving engagement with one of said drive members upon actuation of said displacing means, said apparatus main portion comprising a brake release member movable with each of said displaceable drive members, said magazine further comprising a pair of individually releasable brake members, each normally applying a frictional drag to one of said reel supporting shafts, and means for causing individual engagement of one of said brake members by one of said brake release members upon displacement of the corresponding one of said drive members.

7. A magazine according to claim 6, in which said magazine is detachable by movement in a predetermined horizontal direction, said main apparatus portion comprising a plurality of horizontally extending securing members and said magazine comprising a plurality of cooperating horizontally extending securing members each engageable with one of said first named securing members upon movement of said magazine in a direction opposite to said predetermined direction, whereby movement of said magazine vertically is prevented.

8. A magazine according to claim 7 further comprising manually operable locking means for preventing movement of said magazine in said predetermined direction.

9. An apparatus of the class described, comprising: a pair of reel members; a magnetic recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means, means for moving said transducing means transversely with respect to said intermediate portion of said recording medium for operative relationship with respect to any one of a plurality of spaced parallel longitudinally extending recording areas thereon; and means responsive to the transverse position of said transducing means for actuating said driving means for selecting one or the other of said reel members to be driven by said driving means, electromagnetically actuated means for moving said transducing means, comprising a cam member, said means responsive to the transverse position of said transducing means including contacts for selecting one of said reel members to be driven, said contacts being actuated by said cam member in accordance with the relative positioning between said contacts and said cam member.

10. An apparatus according to claim 9, in which said electromagnetically actuated means comprises a pivoted lever and said cam comprises an arcuate surface concentric with said pivot.

11. An apparatus according to claim 10, in which said lever is elongated and pivoted intermediate its ends, one end of said lever being arranged for movement with said transducing means and said cam member being arranged for movement with the other end of said lever.

References Cited in the file of this patent

UNITED STATES PATENTS

| | | |
|---|---|---|
| 326,457 | Rohme | Sept. 15, 1885 |
| 1,713,277 | Goldberg | May 14, 1929 |
| 2,106,722 | Collison et al. | Feb. 1, 1938 |
| 2,109,627 | Finch | Mar. 1, 1938 |
| 2,380,392 | Begun | July 31, 1945 |
| 2,438,222 | Lear | Mar. 23, 1948 |
| 2,468,198 | Heller | Apr. 26, 1949 |
| 2,499,700 | Tinkham | Mar. 7, 1950 |
| 2,513,423 | Owens | July 4, 1950 |
| 2,532,541 | Dale | Dec. 5, 1950 |
| 2,561,698 | Hogan | July 24, 1951 |
| 2,572,596 | Camras | Oct. 23, 1951 |
| 2,574,218 | Lynch | Nov. 6, 1951 |
| 2,619,208 | Gerst | Nov. 25, 1952 |

(Other references on following page)

UNITED STATES PATENTS

| | | |
|---|---|---|
| 2,631,855 | Kornei | Mar. 17, 1953 |
| 2,645,495 | Nelson | July 14, 1953 |
| 2,647,752 | Barker | Aug. 4, 1953 |
| 2,650,830 | Potter | Sept. 1, 1953 |
| 2,651,394 | Sinclair | Sept. 8, 1953 |
| 2,653,190 | Godeck | Sept. 22, 1953 |
| 2,668,059 | Roberts | Feb. 2, 1954 |
| 2,676,022 | Roberts | Apr. 20, 1954 |
| 2,703,714 | Demby | Mar. 8, 1955 |
| 2,712,448 | Schroter | July 5, 1955 |
| 2,712,572 | Roberts | July 5, 1955 |